United States Patent [19]
Besik et al.

[11] Patent Number: 5,772,421
[45] Date of Patent: Jun. 30, 1998

[54] LOW NOX BURNER

[75] Inventors: Ferdinand K. Besik, Mississauga; Shahrzad Rahbar, Thornhill; Henry A. Becker; Andrzej Sobiesiak, both of Kingston, all of Canada

[73] Assignee: Canadian Gas Research Institute, Ontario, Canada

[21] Appl. No.: 562,999

[22] Filed: Nov. 27, 1995

Related U.S. Application Data

[63] Continuation-in-part of Ser. No. 451,471, May 26, 1995, abandoned.

[51] Int. Cl.[6] .................................................... F23C 5/00
[52] U.S. Cl. ................................. 431/8; 431/9; 431/115; 431/181; 431/187
[58] Field of Search ............................ 431/8, 9, 10, 115, 431/116, 181, 188, 189, 187, 175, 183, 285, 190

[56] References Cited

U.S. PATENT DOCUMENTS

| | | | |
|---|---|---|---|
| 4,357,134 | 11/1982 | Katsushiga et al. | 431/9 |
| 4,626,195 | 12/1986 | Sato et al. | 431/188 |
| 4,797,087 | 1/1989 | Gitman | 431/187 |
| 4,945,841 | 8/1990 | Nakamachi et al. | 431/116 |
| 4,946,382 | 8/1990 | Kobayashi | 431/8 |
| 5,076,779 | 12/1991 | Kobayashi | 431/8 |

FOREIGN PATENT DOCUMENTS

| | | |
|---|---|---|
| 0 343 746 A2 | 11/1989 | European Pat. Off. . |
| 0 413 309 A2 | 2/1991 | European Pat. Off. . |
| WO 92/19913 | 11/1992 | European Pat. Off. . |

OTHER PUBLICATIONS

"Development of burners which provide wide and uniform temperature heating with Low NOx" in *1989 International Gas Research Conference*, by C. Ikai et al, 1989.

"An experimental investigation of NOx formation in recuperative radiant tube" in *1989 International Gas Research Conference*, by Shyam N. Singh et al, 1989.

"Low NOx high temperature burners", by Robert V. Gemmer.

"Proceedings of the 1989 International Gas Research Conference", in *1989 International Gas Research Conference*, by Thomas L. Cramer (Ed.), Nov. 1989.

"Application of Low NOx Combustion Technique for Regenerative System", in *AFRC/JFRC International Conference on Environmental Control of Combustion Processes*, by Naoto Saiki and Kenji Koizumi, 1994.

"Low NOx Combustion Technique for High Temperature Furnace", in *AFRC/JFRC International Conference on Environmental Control of Combustion Processes*, by Eiji Shigeta et al., 1991.

*Primary Examiner*—James C. Yeung
*Attorney, Agent, or Firm*—Birch, Stewart, Kolasch & Birch, LLP

[57] ABSTRACT

A burner for the combustion of fuel and air in an industrial furnace, for use in connection with preheated combustion air, is provided having an equal number of evenly spaced air jets and fuel jets. The air jets and fuel jets are discharged so that they initially diverge away from one another, but eventually, the fuel jets are entrained by the air jets. During the course of their trajectories, before meeting, the air jets and fuel jets entrain resident furnace gases which results in heavy dilution of the fuel and air before combustion. The dilution causes off-stoichiometric combustion conditions and results in a lower flame temperature. This is similar in effect to external flue gas recirculation. As well, the fuel jets undergo pyrolysis in the course of their trajectories before entrainment occurs. This creates a reducing zone in which the NOx in the resident furnace gases being entrained is reduced, in part, back to molecular nitrogen.

NOx emissions from such a burner are shown to be well below that of conventional burners.

21 Claims, 12 Drawing Sheets

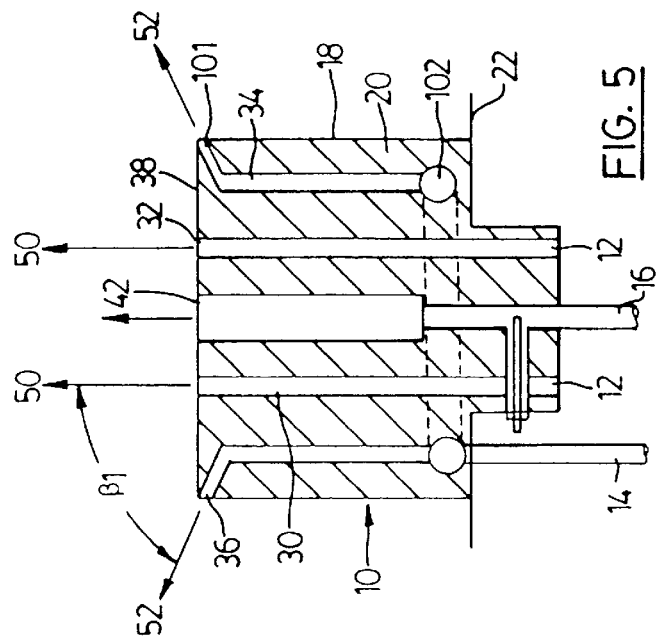
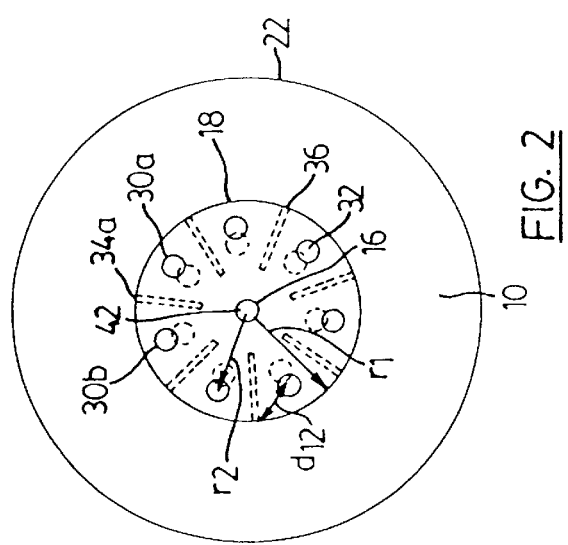
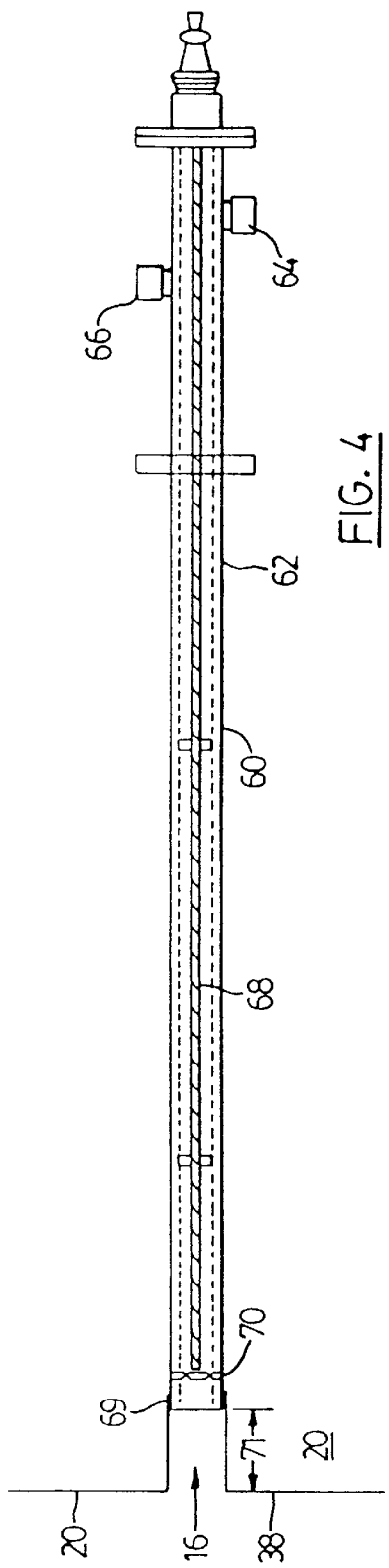

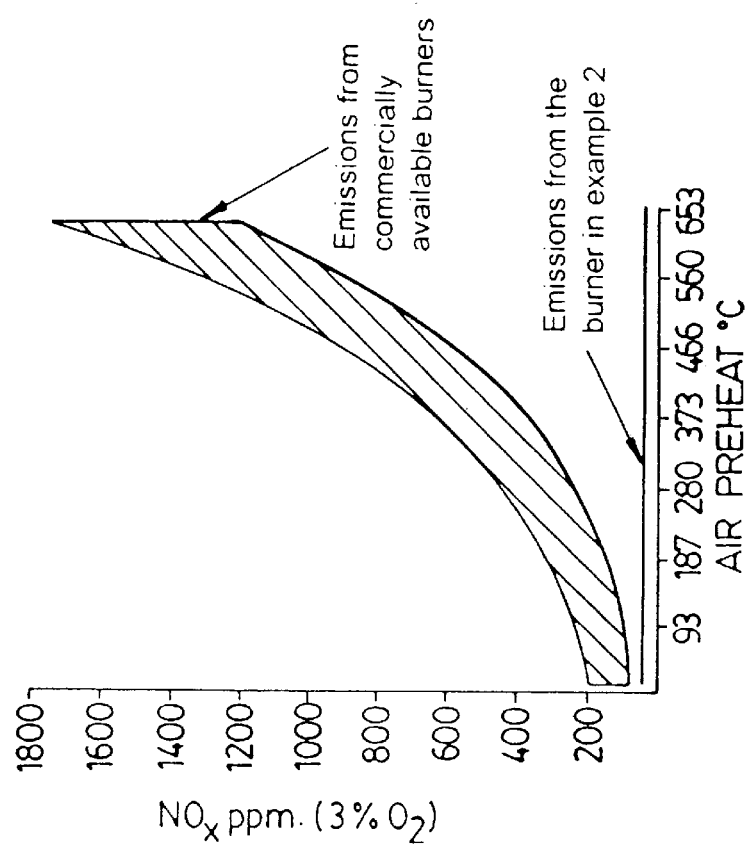
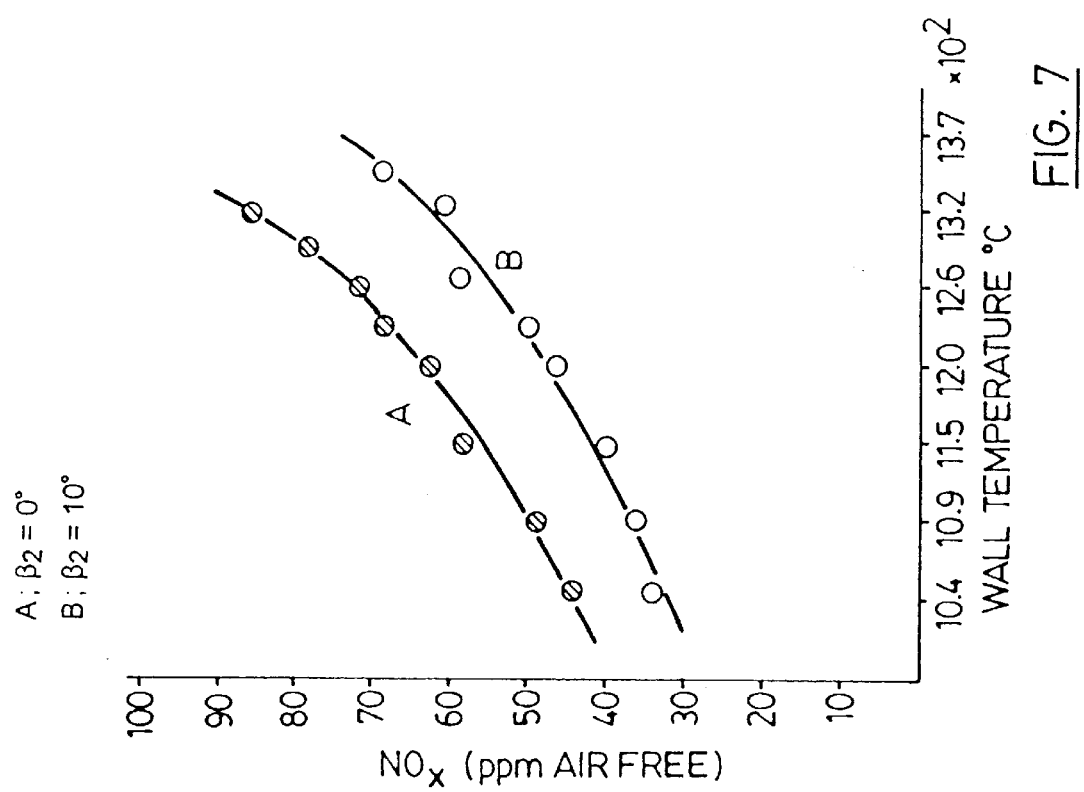
FIG. 8
FIG. 7

EXHAUST-GAS $NO_x$ LEVEL VS. COMBUSTION AIR TEMPERATURE WITH
EXHAUST-GAS $O_2$ LEVEL AS THE PARAMETER

Burner parameters: $D_1$ = 6.35 mm (1/4"),
$D_2$ = 19.05 mm (3/4"),
$\beta_1$ = 30°, $\beta_2$ = 10°
Firing rate: 289-368 kW.
Pilot burner on.

| Symbol | Burner parameters |
|---|---|
| ○ | $D_1 = 6.35$ mm (¼"), $D_2 = 19.05$ mm (¾"), $\beta_1 = 30°$, $\beta_2 = 10°$ |
| ● | $D_1 = 6.35$ mm (¼"), $D_2 = 19.05$ mm (¾"), $\beta_1 = 42.5°$, $\beta_2 = 10°$ |

Fixed burner parameters: $D_1 = 6.35$ mm (¼"), $\beta_1 = 35°$

| Symbol | Variable burner parameters |
|---|---|
| □ | $D_2 = 15.88$ mm (⅝"), $\beta_1 = 35°$ |
| ○ | $D_2 = 19.05$ mm (¾"), $\beta_1 = 35°$ |
| △ | $D_2 = 24.31$ mm (0.957"), $\beta_1 = 35°$ |
| ⋯ | $D_2 = 19.05$ mm (¾"), $\beta_1 = 30°$ |

Burner parameters: $D_1$ = 6.22 mm (0.245"), $D_2$ = 15.88 mm (5/8") $\beta_1$ = 65°, $\beta_2$ = 10°
Firing Rate: 291 - 376 kW, Pilot Burner ON.
Key to Data:

| Air Temperature, °C | 400-402 | 382 | 357 | 252 | 230 | 206 |
|---|---|---|---|---|---|---|
| Symbol: | ○ | □ | △ | ▽ | + | × |

Key to Data:

| Case: | A | B | C |
|---|---|---|---|
| Symbol: | ○● | □ | △ |

Point B at x = 0: burner rim (port circle)
Note: $R_f$ = 500 mm is at the roof or floor of the furnace, and x = 3000 mm is at the blind sidewall, opposite the burner sidewall.

LOW NOX BURNER

This application is a continuation-in-part of application Ser. No. 08/451,471, filed on May 26, 1995, the entire contents of which are hereby incorporated by reference, now abandoned.

FIELD OF THE INVENTION

This invention relates to a burner that provides low level NOx emissions from the combustion of gaseous fuel in air, and in particular is concerned with a burner configuration which curbs NOx formation when the combustion air is preheated to high temperatures.

BACKGROUND OF THE INVENTION

Natural gas is generally considered one of the most environmentally favourable fossil fuels. The combustion of natural gas can, nonetheless, be the source of undesirable pollutants. The main pollutants from natural gas combustion are oxides of nitrogen, including NO (Nitric Oxide) and $NO_2$ (Nitrogen Dioxide), collectively referred to as NOx.

The impact of NOx on photochemical reactions, urban smog and acid rain is now well-known and documented. Growing environmental concerns have led to increasingly stringent regulations on NOx emission limits throughout the industrial world. Regulatory pressure has prompted substantial research and development aimed at developing combustion systems that adequately ameliorate the emission of NOx.

However, many high temperature industrial operations use the combustion of natural gas as a source of process heat. These industrial operations necessarily result in high fuel gas exit temperatures and high energy losses in the stack. Preheating the combustion air by recovering of heat from the fuel gases can reduce fuel consumption which increases process efficiency and decreases $CO_2$ emissions. However, increasing the combustion air temperature results in a higher flame temperature, and unless countermeasures are taken, this adversely affects NOx levels.

Formation of NOx in the Combustion of Natural Gas

The emission of $NO_x$ from an industrial combustion system, typically comprising one or more burners and a furnace, depends on the quantities of $NO_x$ formed and decomposed in the main combustion reaction zones of the system. Both the burners and the furnace influence the emissions. One crucial distinguishing feature is the manner in which fuel and oxidant are introduced by a burner. In premix combustion, they are first mixed and then injected into the combustion chamber. In nonpremix combustion, they are injected separately, and mixing and burning occur together in the combustion chamber. For industrial systems, nonpremix combustion has many advantages, and is usually preferred. The present invention incorporates nonpremix combustion, and is not concerned with systems based on premix combustion, or hybrids of the two.

It is generally accepted that formation of NOx in natural gas fired combustion systems occurs by two mechanisms known as thermal NOx and prompt NOx. Thermal NOx refers to the high temperature reactions of nitrogen and oxygen discovered by Zeldovich. The prompt NOx mechanism is thought to occur mainly in the preflame zone through reactions involving radicals $C_2$, $C_2H$, $CH$, $CH_2$ with nitrogen and oxygen.

It is thought that $NO_x$ emissions from conventional natural-gas combustion are typically mainly due to thermal $NO_x$. Thermal $NO_x$ formation is known to depend on reactant concentrations and residence times in the main combustion reaction zones, and very strongly on the peak temperatures reached there. Reaction-zone temperature levels rise with increasing air preheat, and $NO_x$ formation has been shown to increase exponentially with the absolute preheat temperature. Emissions of $NO_x$ of 900–1500 ppm (at 3% exhaust-gas $O_2$) from conventional burners have been reported at preheat temperatures in the elevated range 650°–820° C. (conventional burners are here defined as those, mainly of older design, that have no provisions for mitigating $NO_x$ emissions).

Therefore, for processes that require the combustion of natural gas with preheated combustion air, means must be provided to reduce $NO_x$ emissions so as to meet regulatory standards.

Abatement of $NO_x$ can be achieved during or after combustion. Post-combustion technologies, such as fluegas scrubbing, have high capital and operating costs. Most other well-established technologies for reducing NO, emissions from combustion processes with substantial air preheat are commercially unattractive or non-viable. Mechanical fluegas recirculation or recycle, typically requiring extra high-temperature ducting, insulation, high-temperature blowers and controls, is usually quite costly. It is, moreover, often impractical for processes whose flue products are adversely contaminated. Since even complex burners are usually less expensive than the extra equipment needed for fluegas treatment or external fluegas recirculation, it is preferable to control $NO_x$ as much as possible by means of burner design.

It is known that when fluegases are recycled through burners (by external fluegas recirculation), entering the combustion zones with the fuel and/or oxidant, a very substantial suppression of $NO_x$ emission may be obtained. This is partly attributable to dilution, lowering the concentrations of the reactants. The major effect, however, is typically due to the reduction of reaction temperatures. This happens because the fluegases are not at the adiabatic combustion temperature of the products of direct fuel and oxidant combustion, but usually considerably cooler, because of heat transfer in the furnace and beyond, up to the point where the recycle stream is drawn.

It is known that when combustion is conducted fuel-rich, $NO_x$ formation is typically much suppressed. This has led to a variety of burner designs that provide a staging of combustion, either by air staging or fuel staging (also known as $NO_x$ reburning). More complex forms of staging, involving elements of oxidant staging and/or fuel staging have also been proposed. However, attempts to reduce $NO_x$ emissions through staged combustion have had only limited success, and have not proven capable alone of meeting the more stringent legislated limits on $NO_x$ emissions, particularly when substantial air preheat is employed.

It has been appreciated that internal recirculation of combustion products can be achieved by burner design alone, and the following patents disclose such burner designs.

The earliest relevant patent, U.S. Pat. No. 4,357,134 to Katsushige et al. in 1981 proposes a conventional multijet burner, with a fuel port in the center, ringed by a plurality of air ports, all inside a cylindrical refractory burner tunnel, "tile" or "quarl". The axes of the fuel ports diverge slightly from the burner axis. The novelty is in the depth of the quarl, which is short, and the generous spacing of the air ports, allowing furnace gases to be sucked into the quarl around the air jets and be entrained there by both the air jets and the fuel jet. The fuel and air jets meet some distance beyond the quarl exit, inside the furnace chamber, and the entrainment of furnace gases continues all the way, but the amount of gases entrained is limited. This invention has been commercialized, and two of the present inventors (Becker and Sobiesiak) have done research with a commercial version of the burner.

In the next development, U.S. Pat. No. 4,378,205 to Anderson in 1983, the quarl is eliminated entirely, providing unimpeded exposure of oxidant and fuel jets for the entrainment of recirculating furnace gases before they meet. The oxidant can be oxygen or oxygen-enriched air (minimum 30% oxygen). Anderson's preferred embodiment, like that of Katsushige, et al., has the fuel port ringed by a plurality of oxidant ports, here with their axes parallel to the burner axis. Other configurations are mentioned, but not detailed.

Tokyo Gas Co. has developed a burner like Anderson's preferred embodiment that operates on air without oxygen enrichment or oxygen stabilization. Stability of combustion in respect to ignition is achieved by a combination of artifice and natural means. Initially, from cold start, all the combustion air is supplied through an annulus around the axial fuel port. A conventional flame is established, anchored on a disk stabilizer or flame holder attached to (and punctured by) the fuel pipe at the exit plane, partly blocking the air annulus. When the furnace refractory surfaces reach high enough temperatures, the air flow is switched to the surrounding ring of air ports. Stable ignition is thereafter assured by the hot refractory. The performance of this system is described in a paper (E. Shigeta, H. Kanazawa, T. Koizumi & T. Nagata, "Low $NO_x$ combustion technique for high temperature furnace", Paper No. 28) presented at the 1991 AFRC/JFRC International Conference on Environmental Control of Combustion Processes, Honolulu.

Tokyo Gas then took the further, innovative step of putting a plurality of fuel jets on the outside, around a central jet of combustion air as described in U.S. Pat. No. 4,945,841, issued in 1990 to Nakamachi, et al. and assigned to Tokyo Gas. The possibility of having the fuel port axes at an angle to the air port axis is suggested, to control the flame length, but the teaching is to incline the fuel jets at an angle towards the air jet.

Since air (or other oxidant) as well as fuel is injected directly into the furnace in the present invention and in those of Anderson and of Nakamachi, et al., this technique is referred to as FODI (Fuel and Oxidant Direct Injection).

A stretching of FODI toward the theoretical limit of efficacy is posed in U.S. Pat. No. 5,076,779, issued in 1991 to Kobayashi and assigned to Union Carbide. Kobayashi advocates maximum uncoupling of the fuel and oxidant jets, arranging them so they will not meet directly, so they are effectively separated by furnace gases and reaction is spread over the whole furnace volume. The ideal visualized is the perfectly-stirred furnace in which composition and temperature are spatially uniform. This theoretically minimizes thermal $NO_x$ and should also reduce prompt $NO_x$. However, there is no proof that such extreme measures actually yield practical $NO_x$ dividends over configurations with much more modest delays in the meeting of fuel and oxidant. This approach gives much increased potential for ignition problems, combustion oscillations and CO emissions, and application of this idea would have to be approached with caution. In the supporting experimental work of Kobayashi, fuel and pure oxygen were fired at very high injection velocities, and nitrogen was fed from three view ports to simulate a furnace operating with various levels of nitrogen (or of oxygen enrichment of air). This is not a fair test; the pure oxygen jet acts as a stabilizer and the conditions are significantly different from normal combustion with air, air and oxygen, or oxygen enriched air. It should be noted, too, that the intensity of mixing needed to approach the ideal of virtually uniform reaction over the whole combustion chamber volume is impossible in a furnace of industrial scale, so the reaction fields in furnaces fired on Kobayashi's principle are perforce quite non-uniform, which Kobayashi recognizes, though likely less so than in systems with more conventional arrangements. It is well known that uniformity of reaction can be approximated, and just to a very limited degree, only in very small "well-stirred reactors" (typically under 20 cm diameter) fired with large numbers of small high-velocity fuel/oxidant jets.

Accordingly, earlier development of FODI has been by steps. The first was a modest departure from conventional practice by Katsushige, et al. who shortened the burner tunnel or quarl to allow entry by recirculating furnace gases. Anderson abolished the quarl. Nakamachi, et al inverted the conventional arrangement of fuel and oxidant jets, arranging a plurality of fuel jets around an oxidant jet instead of the opposite. Kobayashi, as a $NO_x$-minimization principle, took a different approach and advocated wide separation of fuel and oxidant jets, avoiding direct interaction and effectively converting the whole furnace combustion chamber into a combustion zone. Kobayashi's proposal abandons the conventional idea of a burner as an integral unit installable in a furnace wall, with provisions for fuel and oxidant supply, ignition and detection. The embodiment of Nakamachi, et al. with a ring of fuel ports surrounding an annular oxidant port with a startup fuel port at its core, can be realized as an integral burner unit if the diameter of the fuel-port ring is not excessive.

It is noteworthy that with the elimination of the quarl, burner design has come full circle. A quarl, in general, is a refractory throat, typically a cylindrical or conical hole in a refractory block, through which the fuel and air ports fire into a furnace. Such a block is also called a burner block or burner tile, and the hole or quarl may be called a burner combustion tunnel. In an earlier period of burner evolution, problems were experienced with unstable ignition in cold (as in cold startup) and gas-tight furnaces. Quarl-stabilized burners were then developed that can maintain ignition in cold but leaky furnaces. However, problems persisted with furnaces that are both cold and gas-tight. Greatly cooled products of combustion were circulating into the quarl and, through entrainment, diluting the reacting gases and depressing the reaction temperature. The solution was to configure the quarl to block such circulation, producing burners that are ultra stable, insensitive not only to furnace temperature but also to the composition of the furnace gases. This history is related in the North American Combustion Handbook (2nd ed., p. 235), published by the North American Mfg. Co., Cleveland, Ohio. We have seen that more recently, in the interests of $NO_x$ control, Katsushige, et al. shortened the quarl to once again admit ingress of furnace gases while retaining some of the stabilizing effects of a quarl. Anderson then did away with the quarl completely in order to further promote $NO_x$ reduction, and resorted to other means for stabilization. This marked the full emergence of FODI as a measure for $NO_x$ control. In general, the design of burners for greatest stability and insensitivity to furnace conditions unfortunately also tends to be a recipe for high $NO_x$ emissions. In FODI, burner design is focussed firstly on low $NO_x$ emission, and means must then be devised to deal with the problems of instability.

SUMMARY OF THE INVENTION

Accordingly, it is desirable to provide a burner configuration which can be used in connection with natural gas combustion in air which curbs the production of NOx particularly when the combustion air has been preheated to a high temperature. It is also desirable that such a burner avoid using costly post-combustion scrubbers to satisfy NOx emission limits, and should not require any external recirculation of combustion gases. Additionally, such a burner should preferably be easily adaptable for retrofit.

Accordingly, a burner, for combusting a gaseous fuel is provided. The burner comprises: an oxidant supply duct; a fuel supply duct; an oxidant port means connected to the oxidant supply duct and comprising a plurality of oxidant ports for discharging a plurality of oxidant jets; a fuel port means connected to the fuel supply duct and comprising a plurality of fuel ports for discharging a plurality of fuel jets and arranged around the oxidant ports. The oxidant orifice means and the fuel port means are arranged such that the oxidant and fuel jets diverge from one another. The divergence is such that each of the oxidant or fuel jets entrain a substantial quantity of surrounding furnace gases to effect recirculation of the furnace gases and thereafter the oxidant jets eventually entrain the fuel jets, causing the oxidant jets, the fuel jets and the entrained furnace gases to mix with one another to form a stable combustion zone. The entrainment of furnace gases effects dilution of the oxidant and the fuel in the combustion zone, thereby lowering temperatures in the combustion zone.

In accordance with another aspect of the present invention there is provided:

A method of combusting a gaseous oxidant and a gaseous fuel, the method comprising: discharging the oxidant in a plurality of discrete jets arranged around a longitudinal axis; simultaneously discharging the fuel in a plurality of jets around the oxidant jets; adjacent fuel and oxidant jets being arranged to diverge away from one another such that each of the oxidant jets and the fuel jets entrain a substantial quantity of surrounding furnace gases to effect recirculation of the furnace gases, and such that, thereafter the oxidant jets eventually entrain the fuel jets, thereby resulting in mixing of the oxidant jets, the fuel jets and the entrained furnace gases to form a stable combustion zone, the entrained furnace gases effecting dilution of the oxidant and the fuel in the combustion zone to lower temperatures in the combustion zone.

An important feature of the present invention is the entrainment of one jet by another. For most practical applications, the oxidant will be air, and for this reason, the mass flow of the air will be considerably greater than that of common gaseous fuels. At most practical velocity ranges, the air jets will then have a greater momentum flux than the fuel jets. Accordingly, the fuel jets are arranged encircling the air jets, so that the fuel jets are drawn radially inwards and entrained in the air jets.

It has proved effective to have equal numbers of air and fuel jets alternating with one another, with the air jets located on one circle, surrounded by the fuel jets on a second, larger circle. However, it will be appreciated that numerous variations are possible. For example, it may prove practical to supply at least part of the fuel through jets aligned with the main air jets and/or at least part of the air through jets aligned with the main fuel jets. Strict alternation of the air and fuel jets may not be necessary for all applications.

Further, while the jets should diverge so as to entrain gases, this may not necessarily require the fuel ports to be located radially, outwardly of the air ports. For example, the fuel jets, or at least some of the fuel jets could be located within the air jets, with each fuel jet directed between a pair of air jets. Since all the jets have a small section at their base, the fuel jets can pass between the air jets, for sufficient spacing of the jets, with no interaction. Outside the air jets, the fuel jets will then start to become entrained, and curve back towards the air jets.

The primary feature of the current invention is the divergence of the fuel and air jets. The divergence is such that the oxidant or fuel jets each entrain substantial quantities of recirculating product gases before the oxidant and fuel jets eventually merge with one another to form a stable combustion zone. These products have had considerable heat taken out of them by radiative heat transfer to the furnace sinks. Thus, before fuel and oxidant begin to react chemically, they are both highly diluted with cooled products, so the attainable combustion temperature is typically very significantly depressed.

The dilution of fuel and oxidant with inert product gases in the furnace and the reaction temperature depression accompanying that dilution minimize the residence time of the combusting mixture in high temperature zones, where the formation of thermal NOx occurs, thereby reducing the overall NOx production from the burner. This is similar in effect to that achieved by external flue gas recirculation. Thus the entrainment phenomenon in the pre-combustion zone can be described as "internal flue gas recirculation" as opposed to external fuel gas recirculation. However, this internal flue gas recirculation is much more advantageous as the recirculation occurs inside the furnace enclosure downstream of the burner head without recourse to expensive external ducting to recirculate the fuel gases.

When load is applied to the furnace, heat is extracted from the furnace, and the temperature of the resident furnace gases will be reduced. Thus the entrained gases will be at a lower temperature than that of adiabatic conditions. Therefore, it is believed that the addition of load will increase the second effect of the internal flue gas recirculation, causing a further decrease in the flame temperature. Lower flame temperature means less NOx formation, therefore NOx emissions from a burner constructed in accordance with the current invention can be expected to be inversely proportional to load. Such a phenomenon was observed to occur with simulated load via floor heat sinks during experimentation.

In addition to the internal flue gas recirculation, in the pre-combustion zone, it is believed that the fuel jets undergo pyrolysis during their trajectories before meeting with the air jets. This creates a reducing zone in which the NOx in the resident furnace gases being entrained is reduced in part back to molecular nitrogen. This is, therefore, a further source of NOx abatement experienced with this burner.

The burner of the present invention is advantageous for a number of reasons. The flame is stable, heat distribution is more uniform than conventional burners, and a reasonable turn-down ratio is achievable. The burner is able to withstand high temperatures and is inexpensive to construct. There are no moving parts. A commonly available industrial grade ceramic is used for the ceramic face. The overall burner size is small enough to be suitable for retrofit with existing furnaces. The air and gas pressure requirements are comparable to existing burners In particular the burner does not require a specialized high pressure gas supply, but rather, inexpensive existing supply ducting may be used. Furthermore, the burner is designed for a high temperature furnace with a refractory temperature greater than 900° C. and an exhaust temperature greater than 871° C. As well, there are no problems with start-up. Finally, the burner has been tested in conditions from fuel rich to $O_2$ content of around 6% in the exhaust gases, and the flame remains stable throughout this zone.

BRIEF DESCRIPTION OF THE DRAWINGS

For a better understanding of the present invention and to show more clearly how it may be carried into effect, reference will now be made, by way of example, to a preferred embodiment of the present invention shown in the accompanying drawings in which:

FIG. 2 is a front view of the burner of FIG. 1;

FIG. 4 is a side view of an auxiliary burner in accordance with the present invention;

FIG. 5 is a schematic of an embodiment of an experimental burner as discussed in Example 1;

FIG. 7 is a graph of the effect of combustion air jet angle on NOx for the burners illustrated in FIG. 5 and FIG. 6;

FIG. 8 compares the emissions of the performance of the Example 2 burner with commercially available burners;

DESCRIPTION OF THE PREFERRED EMBODIMENTS

The following description relates to a non-premix, direct fuel injected burner. The burner is configured to eject oxidant and fuel in discrete jets through a number of discrete ports into the combustion zone. The use of air as the oxidant and natural gas as the fuel is contemplated. It will be appreciated that other oxidant sources can be used, such as pure oxygen, or oxygen enriched air, as well as other gaseous fuels, but would require the burner configuration to be selected accordingly. Furthermore, the burner is configured to be used with a maximum input firing rate of 400 kW. It will become evident that other input firing rates can be used, but would also require the number, size and orientation of the ports to be selected accordingly.

Figure 1:
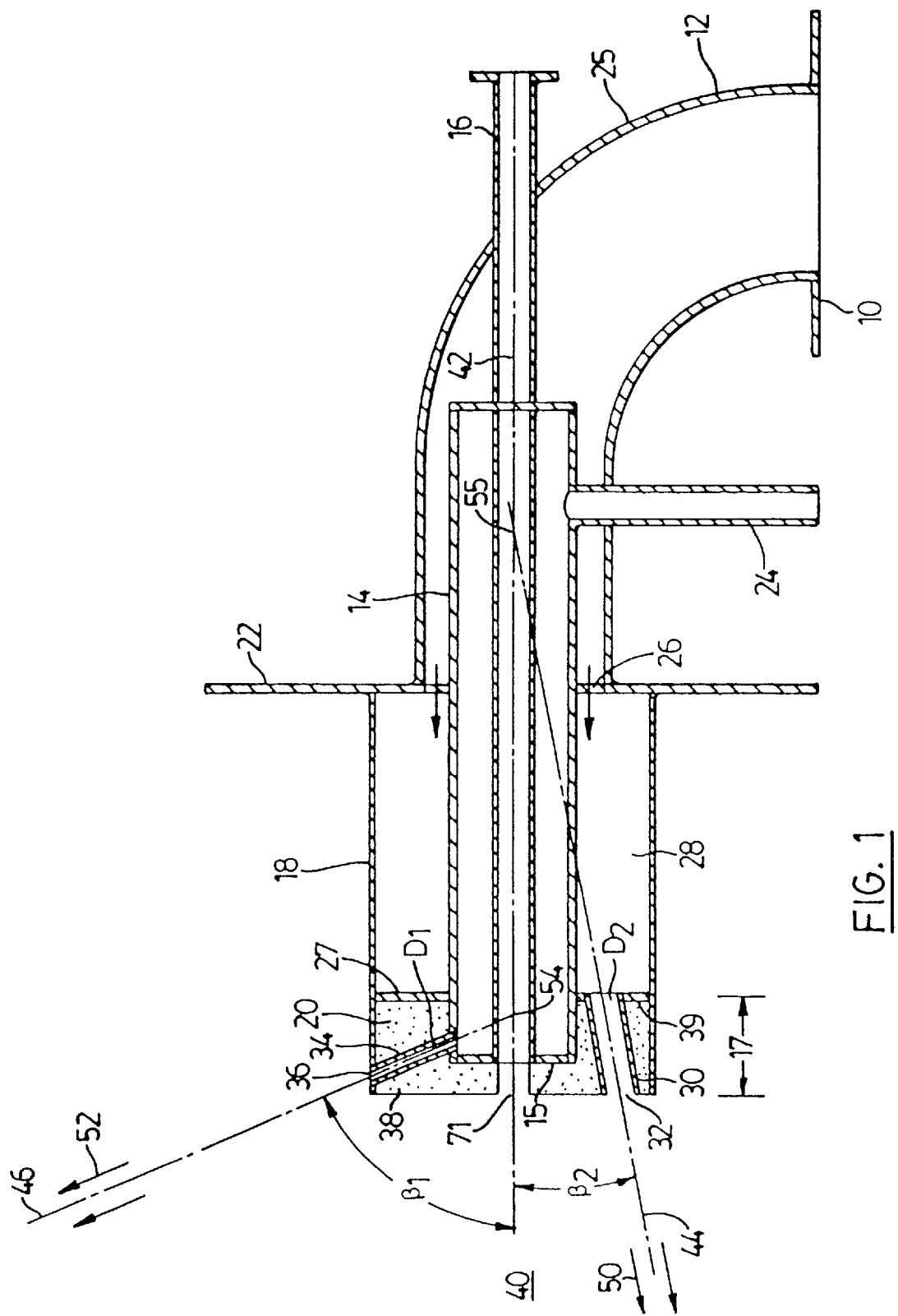
FIG. 1 is a cross-sectional side view of a burner according to the present invention and as discussed in Example 2.

In FIG. 1, a burner for use in an industrial furnace is shown generally at 10. Combustion is achieved by the introduction of fuel and air into a mixing zone 40. The oxidant for combustion is provided by the air, and the air may be preheated before entering the burner. The structure of the burner 10 includes an air supply duct 12, a fuel supply duct 14, a central duct 16, a housing 18, a burner block 20 and a mounting flange 22.

The burner block 20 is located within the housing 18 in the portion of the burner 10 that is exposed to the furnace chamber. The burner block 20 has an external face 38 which will be exposed to furnace conditions and an internal face 39 which is located within the housing 18. The burner block 20 is formed from an industrial grade ceramic material which insulates the burner's components from the high temperatures in the combustion chamber.

The mounting flange 22 is for attachment of the burner to the furnace wall.

The housing 18 extends from mounting flange 22 through insulation on the interior of the furnace chamber and into the furnace cavity. The length of the housing 18 is such that a length 17 of the housing 18 protrudes beyond the interior insulation on the furnace walls into the furnace cavity.

The air supply duct 12 and the fuel supply duct 14 are circular in cross-section. The air supply duct 12 has a longitudinal axis 42 which is co-axial with the longitudinal axis of the fuel supply duct 14 and the housing 18. The fuel supply duct 14 is smaller in diameter than the air supply duct 12 and is contained within the air supply duct 12. The fuel supply duct 14 extends through the mounting flange 22 and is embedded at one end 15 into the burner block 20.

The air supply duct 12 has two sections—an initial source duct 25 and an annular chamber 28. The annular chamber 28 is formed by the housing 18 and the fuel supply duct 14. The air supply duct 12 expands at the mounting flange 22 from the air source duct 25 into the annular chamber 28. The annular chamber 28 ends at the burner block 20. At the internal face 39 of the burner block 20, an internal flange 27 supports the rear of the burner block 20. A ring of holes 26 is provided in the mounting flange 22 to facilitate flow between the air source duct 25 and the annular chamber 28.

Combustion air, which may be preheated to an elevated temperature, enters the air supply duct 12 at the mouth of the initial source duct 25 and passes through the ring of holes 26 into the annular chamber 28. Air ports 30 extend through the internal flange 27, and are embedded in and extend through the burner block 20. There are seven air ports 30; only one is shown in cross-section in FIG. 1 Air exit ports 32 are located at the end of each air port 30. Each air exit port 32 has a diameter $D_2$. Air is discharged from the annular chamber 28 through the air ports 30 past the air exit ports 32. Thus air enters the combustion zone in discrete air jets 50.

A fuel inlet 24 supplies fuel to the fuel supply duct 14. Fuel ports 34 extend from the fuel supply duct 14, through the burner block 20 and through the housing 18. There are seven-fuel ports 34; only one is shown in cross-section in FIG. 1. Fuel exit ports 36 are located on the housing 18 at the end of the fuel ports 34. The fuel exit ports have a diameter $D_1$. Fuel is discharged from the fuel supply duct 14 through the fuel ports 34 past the fuel exit ports 36. Thus fuel enters the mixing zone 40 in discrete fuel jets 52. The length 17 is such that the fuel exit ports 36 clear the insulation on the furnace walls.

The burner 10 has a longitudinal axis 42. Each air port 30 has a longitudinal axis 44. The longitudinal axes 44 of the air ports 30 are orientated at some angle, $\beta_2$, from the longitudinal axis 42 of the burner 10. All of the air ports 30 are orientated at the same angle, $\beta_2$. The air exit ports 32 are evenly spaced around the longitudinal axis 42 of the housing 18 at a constant distance from a point 55, where their axes intersect the longitudinal axis 42 of the burner 10. Similarly, each fuel port 34 has a longitudinal axis 46. The longitudinal axes 46 of the fuel ports 34 are orientated at some angle, $\beta_1$, from the longitudinal axis 42 of the burner 10. All of the fuel ports 34 are orientated at $\beta_1$. The fuel exit ports 36 are evenly spaced axially around the longitudinal axis 42 of the burner 10 and are located at a constant distance from a point 54 where the longitudinal axes 46 intersect the longitudinal axis 42. $\beta_1$ is greater than $\beta_2$. It will be recognized that the longitudinal axes 42, 44 and 46 are also axes of rotational symmetry due to the circular cross-section of the elements involved.

Since $\beta_1$ is greater than $\beta_2$, the fuel jets 52 will be discharged externally to the air jets 50. Since both $\beta_1$ and $\beta_2$ are inclined away from the longitudinal axis 42, the air jets 50 and the fuel jets 52 discharge divergent from one another. Furthermore, since the diameter $D_2$ of the air exit ports 32 is greater than the diameter $D_1$ of the fuel exit ports 36, the discharged air jets 50 are larger than the discharged fuel jets 52.

The air jets must be larger than the fuel jets when using air as the oxidant to achieve combustion because air comprises only approximately 20% oxygen. If another oxidant is used, appropriately sized ports would be provided. However, for the desired aerodynamic mixing in the combustion zone, which results in the reduced NOx production, the details of which will be discussed below, it is necessary for the internal jets to be larger and stronger, i.e. to have greater mass and momentum flux, than the external jets.

Turning now to FIG. 2, $N_a$, the number of air ports 30, is equal to $N_f$, the number of fuel ports 34. Experiments have shown that equal numbers of air and fuel jets are preferred, as unequal numbers can result in a non-uniform flame. Seven air ports 30 and seven fuel ports 34 are shown in FIG. 2, therefore $N_a=N_f=7$, although different numbers may be used for different thermal inputs. The centre of the fuel exit ports 36 are at a constant radial distance $r_1$ from the axis 42. The centre of the air exit ports 32 are at a constant radial distance $r_2$ from the axis 42. Each fuel port 34 is interspaced between two successive air ports 30 and is equidistant from each adjacent air port 30. For example fuel port 34a is located halfway between air port 30a and air orifice 30b. The distance between adjacent fuel and air ports is $d_{12}$.

The pattern of jets emerging from the burner is fuel-air-fuel etc. with the fuel and air jets diverging from each other and from the longitudinal axis of the burner 10, with the fuel jets to the outside of the air jets.

It will be understood from the above discussion of FIG. 1 that the configuration of the burner is such that the combustion air and fuel do not mix within the burner itself. Mixing does not occur until the fuel and air are discharged into the mixing zone 40. The pattern of mixing in the mixing zone 40 is determined by the discharge pattern of the air jets 50 and the fuel jets 52 from the burner which, in turn, is influenced by the numbers, sizes and relative arrangement of the air ports 30 and the fuel ports 34.

Figure 3A:
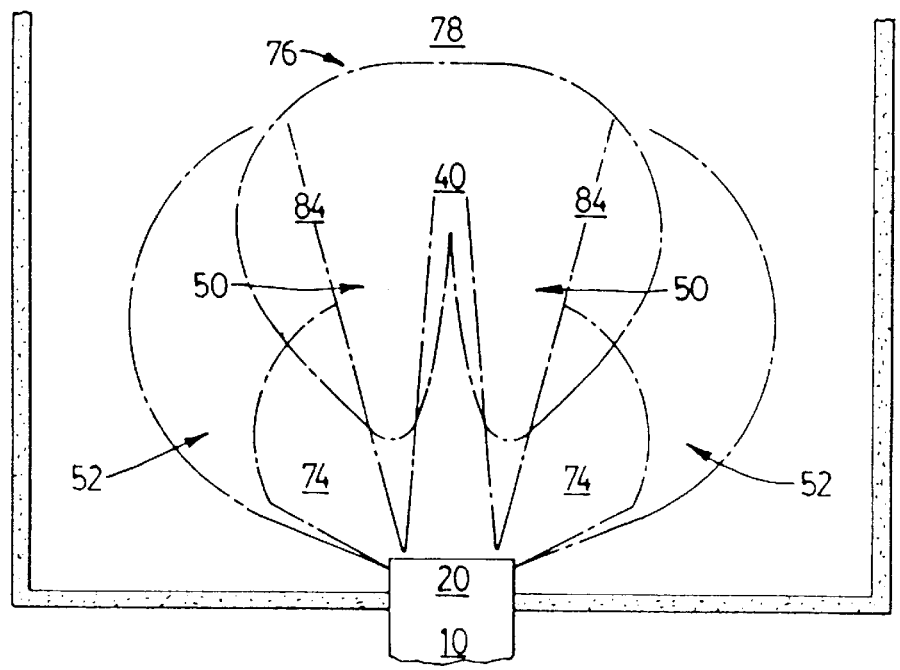
FIG. 3a and FIG. 3b are schematics of mixing patterns of the air jets and fuel jets emitted by a burner in accordance with the present invention.

Mixing may now be illustrated by reference to FIG. 3a. There are three zones within the furnace—a pre-combustion zone 74, a combustion zone 76, and a post-combustion zone 78. When the air jets 50 and the fuel jets 52 enter the pre-combustion zone 74, they do so in a divergent manner with the fuel jets 52 external to the air jets 50 (because $\beta_1$ is greater than $\beta_2$). However, it is believed that a fuel jet, when discharged between two air jets, will enter the entrainment domain of the air jets, and will eventually split and follow a curved trajectory towards the two neighbouring air jets by which they will be fully entrained at a point of confluence 84 in due course. The combustion zone 76 does not occur until sufficient mixing of fuel and air develops at or near the point of confluence 84. Product gases move through the post-combustion zone 78 after combustion is completed.

Figure 3B:
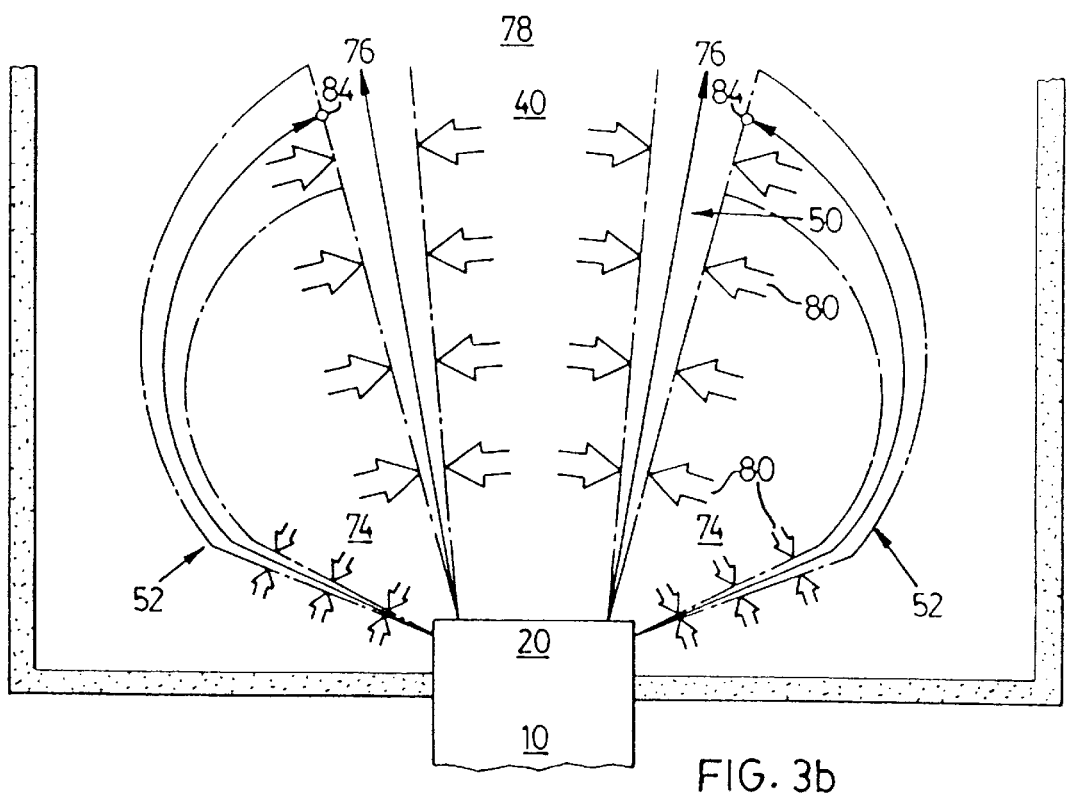

FIG. 3b further illustrates the mixing pattern as described above. The air jets 50 are not only larger than the fuel jets 52 but also, the relative supply rate of fuel and air is such that the air jets 50 are stronger and of greater mass and momentum flux than the fuel jets 52, the volume flow of the air jets being approximately ten times that of the fuel jets for natural gas. Therefore the development of the air jets 50 remains largely unaffected by neighbouring fuel jets 52.

As each air jet 50 develops downstream of the burner head it is believed its behaviour roughly resembles that of an isolated point-source turbulent round jet which entrains resident furnace gases 80 as it moves through the pre-combustion zone 74. As a result, the fuel jets 52 move through a field of inwardly flowing resident furnace gases 80 which are being entrained by the air jets 50. Because the momentum flux of the fuel jets 50 is relatively small, the trajectories of the fuel jets 52 are affected by the inwardly-flowing furnace gases 80. The momentum of the inwardly flowing gases 80 causes the trajectories of the fuel jets 52 to curve. Eventually, the fuel jets 52 merge with, or become entrained by, the air jets 50. The point at which they merge is called the point of confluence, 84. During the course of their trajectories, the fuel jets 52 also entrain furnace gases 80. Hence, by the time the fuel jets 52 merge and mix with the air jets 50, both air jets 50 and fuel jets 52 have entrained resident furnace gases 80.

It is believed that the aerodynamic mixing pattern of the jets and the resulting entrainment of the resident furnace gases 80 in the pre-combustion zone 74 is the primary factor which results in the reduced NOx emissions from this burner.

Difficulties with the flame stability of this burner, at low furnace operating temperatures, may be encountered. (It is believed that these difficulties are due to the divergence of the air and fuel jets as discussed above.) An auxiliary burner 60, illustrated in FIG. 4, is included. As is common in the art, the auxiliary burner 60 is used as a pilot burner for ignition of the main burner 10. However, experimental results indicate that operating the auxiliary burner 60 continuously during combustion, particulary when $\beta_1$ is relatively large, improves flame stability without a creating a penalty in NOx emission. Therefore, for improved flame stability, it is recommended that the auxiliary burner 60 be continuously fired during operation of the burner 10.

The auxiliary burner 60 has a main body 62. The main body 62 has an air inlet 64 and a fuel inlet 66 through which air and fuel, respectively, are introduced. Air and fuel are mixed in the interior of the main body 62. Ignition for combustion is provided by a spark electrode 68. The flame produced when the spark electrode 68 ignites the gases is emitted through a pilot orifice 70 at one end, the flame end 69, of the auxliary burner 60.

It will be recognized that the auxiliary burner 60 is structurally similar to known pilot burners commonly used to ignite commercial burners in cold conditions. In fact, the auxiliary burner 60 of the present invention also functions as a pilot burner. It will be evident that other suitable pilot burner structures may be substituted for that as illustrated in FIG. 4.

Referring back to FIG. 1, the auxiliary burner 60 is placed inside the central duct 16. The central duct 16, co-axial with the housing 18, extends from behind the mounting flange 22 and is embedded in and extends through the burner block 20. The flame end 69 of the auxiliary burner is not flush with the external face 38 of the burner block 20 but rather is located within the burner block 20 at some distance 17 from the external face of the burner block 38 so that a portion of the burner block 20 acts as a flame holder for the auxiliary burner 60. The distance 17 must be at least one inch to prevent lift off of the flame.

The materials used to construct this burner must withstand high temperatures encountered during its operation. In the preferred embodiment, all elements, except for the burner block 20, are constructed from high temperature stainless steel. In particular, the air ports 30 and the fuel ports 34 are lined with stainless steel with a grade of SS316. The burner block 20 is made from an industrial grade refractory ceramic material able to withstand high temperature conditions. It will be understood however, that the other suitable temperature resistant materials can be substituted.

Although in FIG. 1 the air exit ports 32 are located on the external face 38, and the fuel exit ports 36 are located on the housing 18, it will be understood that in other embodiments, the location of either of these two types of exit ports, on either the burner face or the housing, will depend on the precise location of the relevant port, the angle at which the orifice is orientated, and the dimensions of the burner block itself.

Furthermore, other ducting arrangements of the air supply duct, the fuel supply duct, etc may be used to feed the ports as disclosed.

Further, the burner block need not be perfectly cylindrical. Its end face could be a three-dimensional curved surface, which could be shaped so that all the ports are perpendicular to the surface.

Further, it may not be necessary for the ports or jets to diverge from one another. If the jets are placed sufficiently far apart, it may not be necessary to direct them away from each other (and it may in fact be necessary to direct them towards each other). In this case, subject to appropriate mixing to achieve a stable flame, the jets will still entrain resident furnace gases before mixing, diluting the jets, thereby lowering the flame temperature and decreasing NOx emissions. It may also be possible for the ports to be provided in a variety of different shapes and patterns, e.g. slot, annular etc.

The preferred embodiment as described has the number of air ports equal to the number of fuel ports, $N_a=N_f=7$. It will be recognized that for maximum nominal inputs other than 400 kW, $N_a$ and $N_f$ will be selected as is appropriate. Furthermore, for some cases, it may not be necessary to have any precise correspondence between the number of oxidant jets and fuel jets.

While the preferred embodiment is directed to NOx formation from the combustion of natural gas in air, it is to be recognized that the burner configuration can be used with respect to any fuel that emits NOx or other pollutant whose formation depends upon the flame temperature.

EXPERIMENTATION

KEY TO VARIABLES

| | |
|---|---|
| $d_{12}$ - | distance between centres of exit of adjacent fuel and air ports of a burner, mm |
| $D_1$ - | burner fuel port diameter, mm |
| $D_2$ - | burner air port diameter, mm |
| $m_a$ - | mass flux of combustion air, kg/s |
| $m_e$ - | mass flux of exhaust gas from the combustion chamber, kg/s |
| $m_f$ - | mass flux of fuel (natural gas), kg/s |
| $m_f (-\Delta h_c)$ - | standard rate of combustion heat release, W |
| $N_a$ - | number of air ports |
| $N_f$ - | number of fuel ports |
| $r_1$ - | radial position (from the burner axis) of the centre of a fuel port at exit, mm |
| $r_2$ - | radial position (from the burner axis) of the centre of an air port exit, mm |
| $S_b$ - | total surface area of bare floor sink panels, m² |
| $S_c$ - | total surface area of covered floor sink panels (covering was of 25.4 mm thick refractory insulation, sold under the trade mark Cerablanket), m² |
| $S_n$ - | surface are of cold sink at nearfield port, for flame detection trials |
| $T_a$ - | temperature of combustion air at burner entry, °C. |
| $T_r$ - | refractory surface temperature, °C. |
| $\beta_1$ - | angle between fuel port axis and burner axis, deg |
| $\beta_2$ - | angle between air port axis and burner axis, deg |
| $\alpha$ - | off-set angle of fuel ports |
| Theoretical Modelling Variables | |
| $D_o$ - | jet port diameter (either $D_1$ or $D_2$), m |
| N - | number of Jets, = 1, . . . one fuel jet, one air jet |
| $m_e$ - | mass flux of ambient fluid entrained by either jet, kg/s |
| $m_o$ - | the port (feedstream) mass flux in either jet, kg/s |
| $U_1$ - | $=G_1/m_1$, mean port velocity of feedstream 1, m/s; |
| $U_2$ - | $=G_2/m_2$, mean port velocity of feedstream 2, m/s; |
| x, y, z | cartesian coordinates for the problem |
| $x_c$ | distance from the starting plane ("burner face") to the meeting point of the trajectory of the weak ("fuel") jet with the edge of the strong ("air") jet, m [The effective streamwise position of the point of confluence of the jets.] |
| $y_o$ | distance between the centres of the jet ports at exit, characteristic length scale for the problem, m |
| $y_{1,c}$ | lateral position of the meeting point of the trajectory of the weak ("fuel") jet with the edge of the strong ("air") jet, m |
| $\beta_a$ | angle between the starting plane and the port axis of the weak jet (the "fuel" port angle), deg |
| $\beta_b$ | angle between the starting plane and the port axis of the |

-continued

KEY TO VARIABLES

|  | strong jet (the "air" port angle), deg, $\beta_b = 0°$ for this model |
|---|---|
| η | $= y/y_o$, dimensionless cross-stream coordinate, 1 |
| ξ | $= x/y_o$, dimensionless streamwise coordinate, 1 |
| $\xi_c$ | $x_c/y_o$, dimensionless distance to the point of confluence of the jets, 1 |
| $\rho_e$ | density of the gas (the ambient fluid) entrained, kg/m³ |
| ψ | $= G_1/G_2 = m_1 U_1 / m_2 U_2$, momentum-flux ratio of the weak ("fuel") and strong ("air") jets, 1 |

PRELIMINARY EXPERIMENTATION

A number of different burner geometries were constructed and tested to determine the effect of fuel/air discharge pattern. Axial jets, both air and fuel were compared to radial jets of the same. Annular fuel flow was explored. (Annular fuel flow was achieved by introducing fuel into the burner block fuel chamber tangentially via a single fuel port into an annular duct to achieve rotation of the gas and a symmetric annular fuel discharge into the combustion zone. The tangential introduction gave a swirl component to the fuel flow in the duct, so that at the discharge it diverges into a conical flow shape.) As well, a burner in accordance with the concept developed by the Tokyo Gas Co Ltd. R & D Institute was constructed having six external axial air jets combined with a central fuel jet and six radial fuel jets injected tangentially into the air jet streams. (Attempts to repeat the NOx results claimed by the Tokyo Gas Company as described in "Fuel Direct Injection Low NOx Combustion Technique" by Tokyo Gas Co Ltd, 1989 *International Gas Research Conference,* Tokyo Japan, 6–9 Nov. 1989, were unsuccessful.)

As far as the effect of the fuel flow pattern goes, the preliminary testing showed that axial fuel jets produced considerably higher NOx levels than the radial fuel jets. This is contrary to the results presented by the Tokyo Gas Company which indicate that NOx production is optimal at a fuel distribution of 80% axial and 20% radial. The radial fuel jets and the annular fuel discharge produced similar NOx levels. Conventional industry know-how predicts significant stability problems if more than 20% of the fuel is introduced externally to the oxidant.

EXAMPLE

Examples of burners according to this invention are described in detail in Examples 1–4. Studies were performed to evaluate performance of the burners with preheated combustion air as well as with other operating conditions. Results of these tests are included and discussed where appropriate. Unless otherwise specified, all trials were run with 15% excess air, which is equivalent to 3% excess $O_2$ on a dry basis (d.b.) in the exhaust gas. Natural gas was used as the fuel in all cases.

EXAMPLE 1—DEVELOPMENTAL BURNERS

The Example 1 burners were constructed for a maximum input of 65 kW. FIG. 5 illustrates the structure of an Example 1 burner. The structure of his burner is similar to that illustrated in FIG. 1 and the reference numerals of FIG. 1 have been repeated where appropriate.

The Example 1 burners have six air ports 30 orientated at 0°, ($\beta_2=0°$) from the longitudinal axis of the burner 42 and six fuel ports 34 orientated at 65° ($\beta_1=65°$) from the longitudinal axis of the burner 42. The fuel orifices 34 are interspersed between adjacent air ports 30. The diameter of the housing 18 is 152 mm.

There are some structural differences in example 1 as compared to the embodiment shown in FIG. 1. The burner block 20 of Example 1 extends back to the mounting flange 22 and beyond into the air source duct 25. This obviates the need for the internal mounting flange 27 and results in there being no annular chamber 28. Instead, the air and fuel ports 30 and 34 extend throughout the burner block 20, with angled portions 101 at the end of the fuel ports 34 to discharge the fuel jets 52 at the desired angle. Fuel is supplied to the fuel ports 34 by a fuel supply ring 102.

Figure 6:
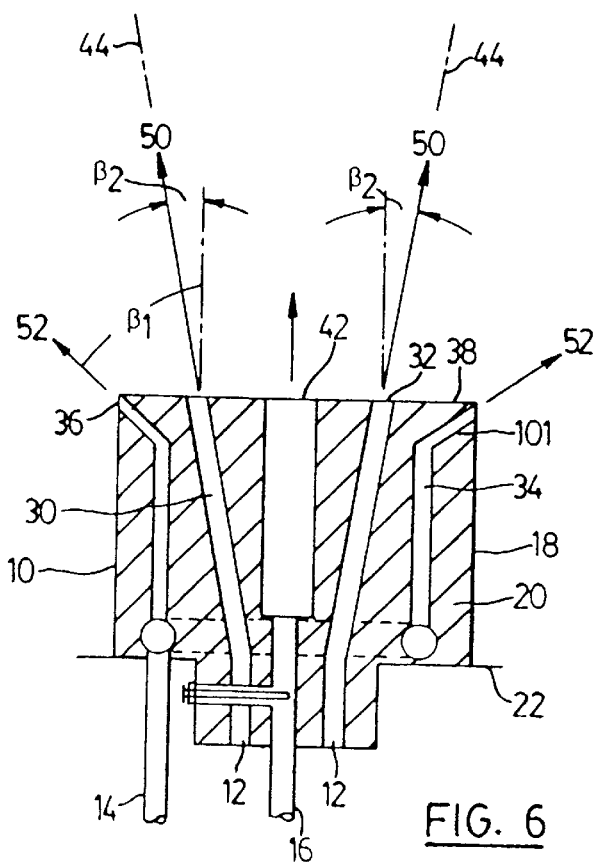
FIG. 6 is a schematic of an embodiment of an experimental burner as discussed in Example 1.

FIG. 6 illustrates a second Example 1 burner. This burner is identical in structure to the that shown in FIG. 5, except that the air ports 30 are orientated at 10°, ($\beta_2=10°$).

The tests were carried out in a test facility that was essentially conventional. It included an independent high temperature combustion air preheater, a combustion tunnel, fuel gas collection-dilution-discharge system and appropriate sampling and analysis equipment. The actual tunnel was of square cross-section with an area of 0.51 m by 0.51 m and an inside length of 2.1 m. The tunnel was lined with refractory material in known manner. The front end of the tunnel had a circular opening for mounting experimental burners.

FIG. 7 is a graphical summary of data collected, showing NOx emissions for the inputs of 65 kW at combustion air temperatures of 632° C., plotted against the surface temperature of the tunnel wall. Curve A corresponds to data from testing with the Example 1 burner of FIG. 5. Curve B corresponds to data from testing with the Example 1 burner of FIG. 6. Curve A and Curve B indicate that air jets at an angle of about 10° from the burner axis, are more effective in reducing NOx than the axially discharging air jets ($\beta_2=0°$).

EXAMPLE 2—400 kW BURNER

Example 2 was a scaled up prototype designed for maximum input levels of 400 kW. The purpose of Example 2 was to develop an optimized burner configuration which resulted in maximum NOx emissions of 30 ppm at 3% excess $O_2$, while operating with 650° C. air pre-heat and furnace temperatures of 1538° C. to 1700° C.

The configuration of Example 2 is the same as is illustrated in FIG. 1 with the following dimensions and characteristics:

| Orifice Configuration |
|---|
| $\beta_1 = 65°$ |
| $\beta_2 = 0°$ |
| $D_1 = 6.22$ mm |
| $D_2 = 18.42$ mm |
| $r_1 = 110$ mm |
| $r_2 = 87.3$ mm |
| $N_a = N_f = 7$ |

Testing was completed for the above burner in a larger testing facility similar to that mentioned before, with a square cross-section area of 1.14 m² and inside length of 4.9 m. No heat sink was provided except that provided by the refractory walls which were lined with 20 cm thick refractory blanket insulation.

Performance data illustrating NOx results in testing of this burner is contained in Table 1. All tests were run at excess $O_2$ levels in the exhaust gas of 3%.

TABLE 1

Performance of the Example 2 Burner

| Nominal Input kW | Air Preheat °C. | % CO$_2$ dry | NOx ppm (3% O$_2$) | CO ppm (3% O$_2$) | Test No. |
|---|---|---|---|---|---|
| 450 | 649 | 10.4 | 13 | 8 | 29 |
| 450 | 316 | 10.5 | 9 | 11 | 30 |
| 450 | 149 | 10.6 | 7 | 11 | 31 |
| 450 | ambient | 10.5 | 7 | 9 | 28 |
| 300 | 649 | 10.6 | 9 | 7 | 21 |
| 300 | 316 | 10.4 | 8 | 6 | 20 |
| 300 | 149 | 10.6 | 6 | 8 | 23 |
| 300 | ambient | 10.5 | 6 | 8 | 22 |
| 150 | 649 | 10.5 | 7 | 7 | 24 |
| 150 | 316 | 10.6 | 7 | 8 | 26 |
| 150 | 149 | 10.1 | 6 | 7 | 27 |
| 150 | ambient | 9.7 | 6 | 10 | 25 |

FIG. 8 shows a comparison of these results with the NOx emissions experienced with commercially available burners. NOx emissions from the Example 2 burner are significantly below those of commercially available burners. Furthermore, in conventional burners NOx emissions increase exponentially with an increase in combustion air preheat temperature. With the Example 2 burner, however, although there is an increase in NOx with rising air preheat temperature, it is a very gradual increase which appears to be linear.

EXAMPLE 3

Figure 9A:
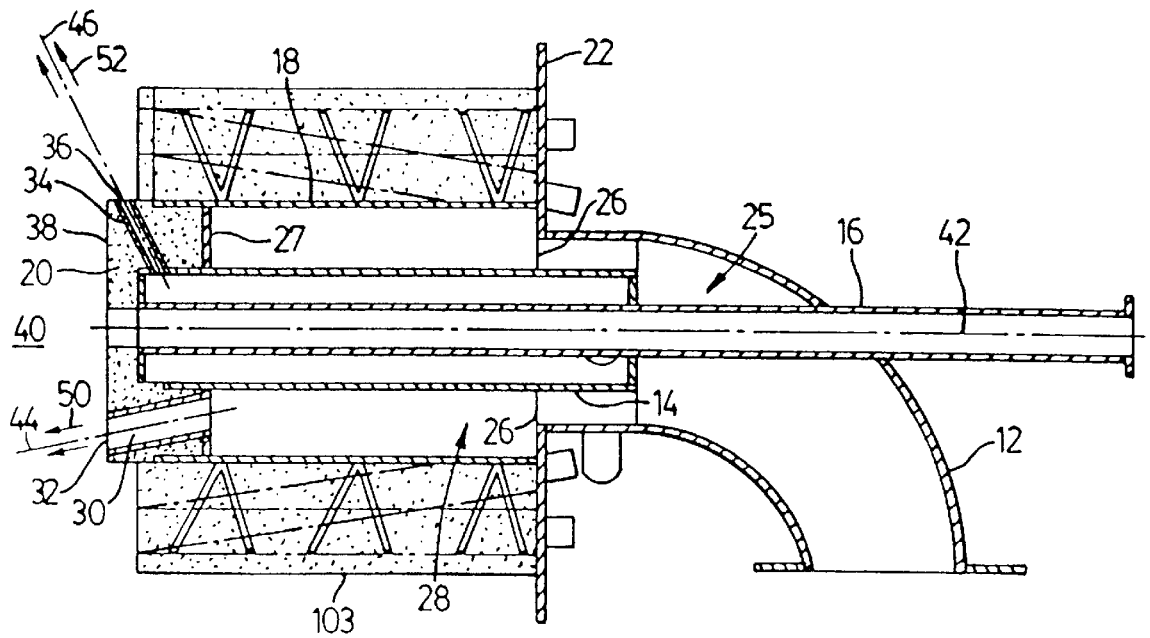
FIG. 9a is a cross-sectional side view of an experimental burner as discussed in connection with Example 3.
Figure 9B:
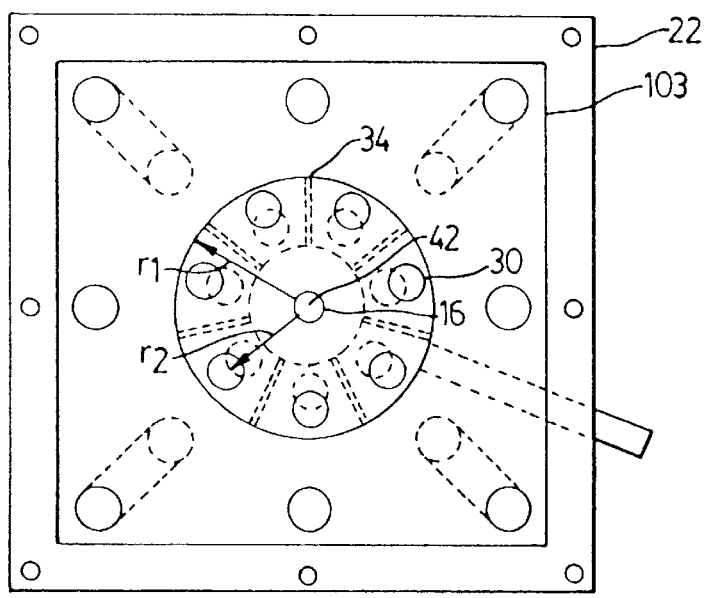
FIG. 9b is a front view of an experimental burner as discussed in connection with Example 3.

The Example 3 burner was constructed to conduct further investigation into burner performance and, in particular, to investigate the effect of furnace geometry on the flame. The Example 3 burner is illustrated in FIGS. 9a and 9b. The Example 3 burner is similar in structure to the embodiment illustrated in FIG. 1 and reference numerals have been repeated where appropriate.

The dimensions and characteristics of the Example 3 burner are as follows:

| Orifice Configuration | Basic Burner Configuration |
|---|---|
| $\beta_1 = 65°$ | Diameter of air source duct 25 = 152.4 mm |
| $\beta_2 = 10°$ | Diameter of fuel supply duct 14 = 89 mm |
| $D_1 = 22$ mm | Diameter of central duct 16 = 35 mm |
| $D_2 = 15.88$ mm | Diameter of housing 18 = 110 mm |
| $r_1 = 110$ mm | Length of housing 18 = 362 mm |
| $r_2 = 87.3$ mm | Longitudinal location of fuel ports 36 = 12.7 mm |
| $N_a = N_f = 7$ | Length of burner block 20 = 79.4 mm |
| | Mounting Flange 22, = 483 mm × 483 mm square |
| | Length of auxiliary burner 60 = 1 m |

It is evident from FIGS. 9a and 9b that there are some structural differences between the Example 3 burner and the embodiment discussed in FIG. 1. The Example 3 burner includes an external refractory portion 103 which was included to fit the burner with the furnace port and does not form part of the present invention.

The furnace used for testing of the Example 3 burner was much larger than the ones used previously. It allowed for firing of three burners side by side and for the simulation of load by extracting heat from the furnace through a water cooled floor. The internal cavity of the furnace was 1 m by 3 m by 45 m. In order to obtain data comparable to the previous Example burners, internal refractory brick walls were placed inside the furnace chamber during some of the trials to vary the furnace chamber size. Sink was provided by bare floor sink panels. To vary sink, portions of the bare floor sink panels were covered with 25.4 mm thick refractory insulation, sold under the trade mark Cerablanket. Some trials were operated with the sink panels fully covered to attempt to reach adiabatic or zero sink conditions. However, the insulation did not fully reduce heat flow to the sink panels, therefore, an assumption of zero sink conditions is an approximation.

Table 2 summarizes the operating conditions and NOx results for the testing of this burner. $S_b$ denotes the total area of bare floor sink panels used throughout the tests and $S_c$ denotes the total area covered by the refractory insulation.

TABLE 2

Results and Operating Conditions of the Trials with the Example 3 burner

| Trial | Combustion Chamber H × W × L, m × m × m | $S_b$, m$^2$ | $S_c$, m$^2$ | m$_f$, g/s | max $T_a$*, °C. | O$_2$, % d.b. | NO$_x$, ppm, d.b. |
|---|---|---|---|---|---|---|---|
| 1 | 1 × 1.5 × 3 | 0 | 4.5 | 4.9–6.9 | 418 | 1.6–6.7 | 16–22 |
| 2 | 1 × 1 × 3 | 0 | 3 | 6.9–7.8 | 392 | 1.5–2.9 | 10–47 |
| 3 | 1 × 1 × 3 | 0 | 3 | 6.1–7.8 | 402 | 1.1–3.5 | 14–46 |
| 4 | 1 × 1 × 3 | 3 | 0 | 6.0–7.8 | 263 | 8.2–9.0 | — |
| 5 | 1 × 1 × 3 | 3 | 0 | 7.7–8.0 | 267 | 3.9–7.9 | 4–10 |
| 6 | 1 × 1 × 3 | 0.75 | 2.25 | 5.9–7.9 | 338 | 1.6–10.2 | 11–18 |
| 7 | 1 × 3 × 4.5 | 0 | 13.5 | 6.0–7.8 | 356 | 0.0–4.8 | 8.5–16 |
| 8 | 1 × 1.5 × 3 | 0 | 3 | 5.8–7.8 | 392 | 1.1–3.2 | 14–25 |
| 9 | 1 × 3 × 4.5 | 13.5 | 0 | 7.9 | 181 | 6.6–6.8 | 5 |
| 10 | 1 × 3 × 4.5 | 1.5 | 12 | 6.1–7.9 | 345 | 3.5–10.6 | 3–7.5 |

*The quantity max $T_a$ is the highest level reached by the air temperature during the trial.

In these trials, the excess air level was maintained at 3% O$_2$.

The results of Table 2 indicate that burner performance was affected by furnace volume. When the burner was fired in a furnace volume comparable to the volume used in Example 2, lower NOx values, similar to those produced by the Example 2 tests were realized. However, when fired in a furnace volume smaller than Example 2 (trials 2, 3) the NOx levels exceeded the Example 2 values and reached 47 ppm at 3% O$_2$.

It is believed that one factor in this phenomenon is the use of a fuel angle of $\beta_1=65°$. The larger the fuel angle $\beta_1$, the farther the fuel jets 52 travel away from the air jets 50 before the trajectories of the fuel jets 52 curve and move back towards the air jets 50. This in turn results in a larger flame volume. It is believed that, with larger fuel angles $\beta_1$, in smaller furnace chambers, the fuel jets will impinge on portions of the furnace interior before they are entrained by the air jets. Thus the fuel jets do not cleanly arc over to be entrained by the air jets and instead, a complex process of mixing and reaction ensues and the flame extends through a greater volume of the internal furnace chamber. Therefore, one of the limitations on the fuel angle $\beta_1$ will be the configuration of the furnace chamber within which the burner is to be used. For optimal performance, particularly of the flame, the fuel port angle $\beta_1$ should be chosen so that the fuel jets are substantially entrained before they reach the internal surface of the furnace chamber.

Therefore, it is concluded from the results of the Example 3 burner that although a fuel angle of 65° shows favourable NOx values, such an angle does have a significant effect on flame stability. Lower fuel angles serve to tighten the flame, lowering its volume.

EXAMPLE 4

It was desired to test the effect of varying burner parameters without constructing a new burner each time.

Therefore, a further experimental burner was constructed with air and jet orifices designed to accommodate threaded inserts so that the angle and diameters of the air and fuel ports could be varied. The construction of a burner with variable inserts was to facilitate experimentation with varying burner configurations, and is not recommended for commercial use.

Figure 10A:
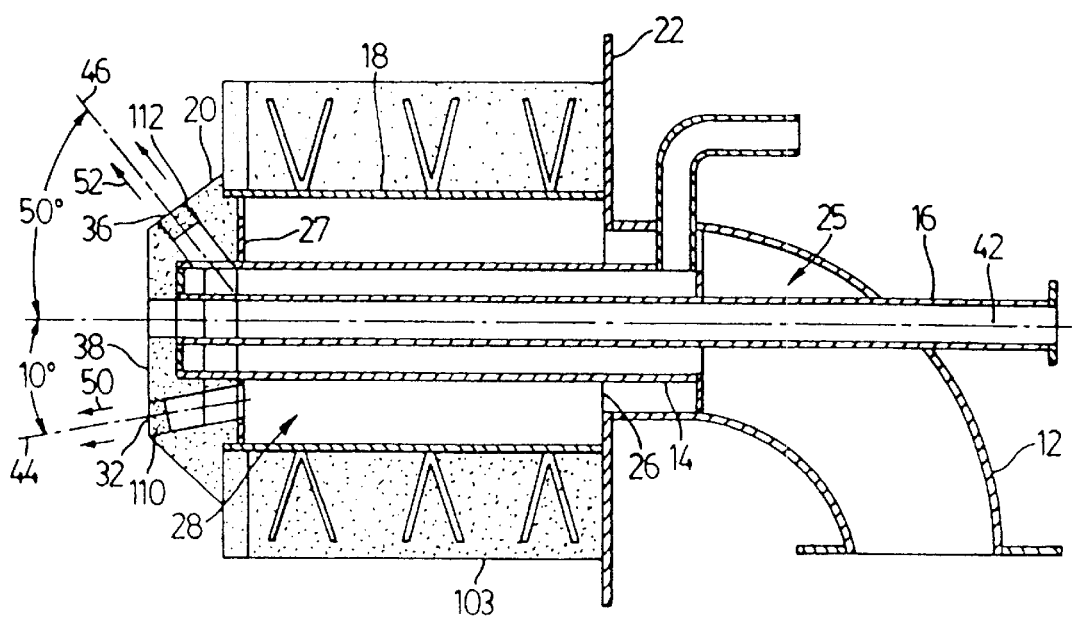
FIG. 10a is a cross-sectional side view of an experimental burner as discussed in connection with Example 4.
Figure 10B:
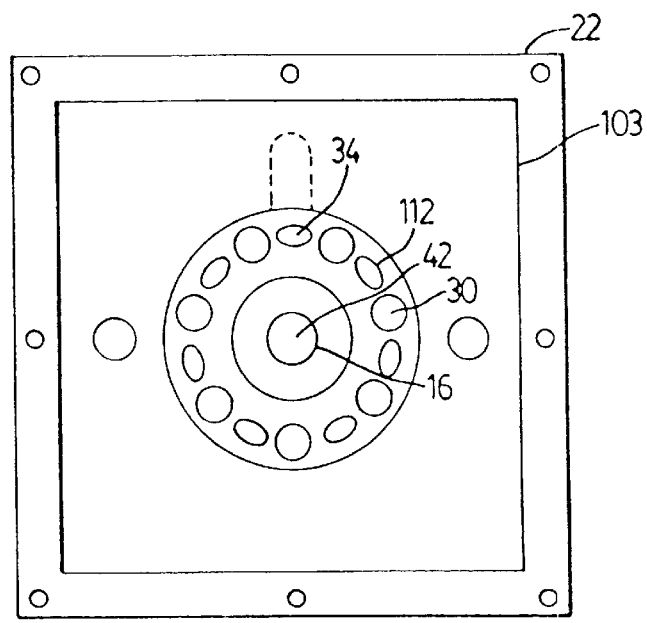
FIG. 10b is a front view of an experimental burner as discussed in connection with Example 4.

The burner body of the Example 4 burner is shown in FIG. 10. Its construction is very similar to that of the Example 3 burner and the preferred embodiment and therefore equivalent reference numerals have been repeated where appropriate.

One significant difference in the structure of the Example 4 burner is found in the fuel and air ports 34 and 30. The apertures in the burner block 20 which surround the ports were widened and provided with internally threaded bores shown as 110 and 112 for the air and fuel respectively. The internally threaded bores 112 for the fuel ports are orientated at an angle of 50° from the longitudinal axis of the burner 42. The internally threaded bores 110 for the air ports are orientated at an angle of 10° from the longitudinal axis of the burner 42. Also, as shown, V-shaped anchors are secured to the housing 18, to reinforce and secure the refractory or ceramic material, in known manner.

Figure 11A:
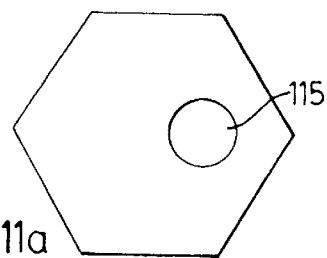
FIGS. 11a and 11b show a top view and side sectional view of a fuel insert used with the burner of Example 4.
Figure 11B:
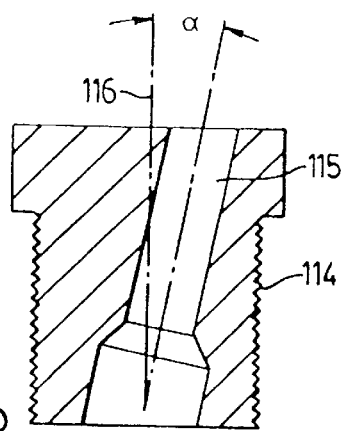

To vary the diameter of the ports and the angle of ejection of the jets, externally threaded inserts were constructed. A fuel insert 114 with an aperture 115 is illustrated in FIG. 11. The aperture 115 provides the effective fuel port diameter $D_1$. The aperture 115 is inclined from the longitudinal axis 116 of the insert 114 at an angle $\alpha$. The insert 114 is designed to be received by a threaded bore 112 of FIG. 10a so that the combination (of the angle of 50° of the threaded bore 112) and angle $\alpha$ results in the desired fuel jet angle $\beta_1$.

Figure 12A:
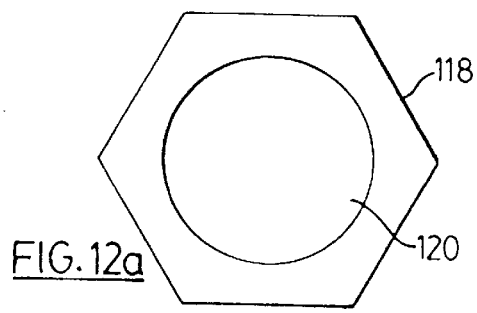
FIGS. 12a and 12b show a top view and side sectional view of an air insert used with the burner of Example 4.
Figure 12B:
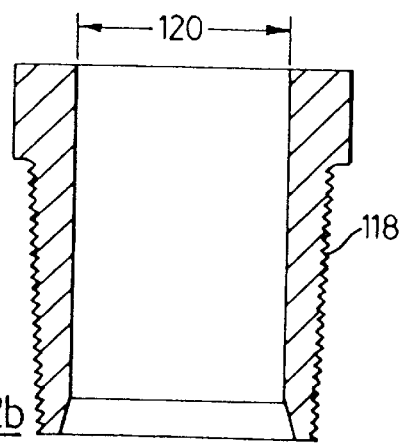

An air insert 118 is illustrated in FIG. 12. The insert 118 has an internal aperture 120 and is designed to be received by a threaded bore 110 of FIG. 10a. Variation in the diameter of the insert 120 enables variation of the effective air port diameter $D_1$. Since the air jet angle, $\beta_2$ was not varied, it was not necessary to incline the aperture in the air insert 118 as the threaded bore 110 was already inclined at 10°.

The specifications of the Example 4 burner, including the variations in $\beta_1$ and $D_2$ that were utilized, are summarized as follows:

| Jet Configuration | Burner Configuration |
|---|---|
| $\beta_1$ = 30°, 35°, 42.5°.65° | Diameter of air source duct 25 = 152.4 mm |
| $\beta_2$ = 10° | Diameter of fuel supply duct 14 = 89 mm |
| $D_1$ = 6.35 mm | Diameter of central duct 16 = 35 mm |
| $D_2$ = 15.88 mm | Diameter of housing 18 = 216 mm |
| 19.05 mm | Length of housing 18 = 394 mm |
| 24.31 mm | Length of burner block = 76.2 mm |
| $r_1$ = 86 mm | Mounting Flange 22 = 483 mm sq. by 6.35 mm |
| $r_2$ = 86 mm | Length of pilot burner 60 = 1 m |
| $N_a$ = $N_f$ = 7 | |

Again, an external refractory portion 103, similar to that discussed in connection with the Example 3 burner was included.

The Example 4 burner was tested in the same furnace as the burner of Example 3. However, only one furnace chamber configuration, 1 m high by 1.5 m long by 3 m long, was employed in these trials. To obtain a full measure of its effects, the excess air level was varied from 2% to 30%, corresponding to exhaust gas $O_2$ from zero to over 5% on a dry basis (d.b.). The entire floor was covered with Cerablanket insulation to approximate operation without sink and this was not varied. As well, there was no variation in recuperating operating conditions. Thus, operationally, the controlling variables were firing rate, excess air level and combustion air temperature. Accordingly, a correlation between those three variables and NOx emission was investigated.

Operating conditions of the burner are summarized as follows:

TABLE 3

Results and Operating Conditions of the Trials with the Example 4 Burner

| Trial | $D_1$ mm | $D_2$ mm | $\beta_1$ deg | $m_f$, g/s | $T_a^*$, max, °C. | $T_r^*$, max, °C. | $O_2$, % d.b. | $NO_x$, ppm, d.b. |
|---|---|---|---|---|---|---|---|---|
| 1 | 6.35 | 15.87 | 35 | 3.0–7.1 | 400 | 1281 | 0–4.9 | 3.4–29 |
| 2 | 6.35 | 15.87 | 35 | 6.2 | 399 | 1278 | 0.8–1.9 | 17–26 |
| 3 | 6.35 | 19.05 | 35 | 4.3–7.9 | 320 | 1231 | 0–2.4 | 2.8–26 |
| 4 | 6.35 | 25.40 | 35 | 3.1–7.6 | 379 | 1326 | 0–1.8 | 18–42 |
| 5 | 6.35 | 19.05 | 30 | 1.5–7.6 | 389 | 1290 | 0–5.1 | 5.8–30 |
| 6 | 6.35 | 19.05 | 42.5 | 1.9–8.0 | 341 | 1252 | 0–3.5 | 8.5–24 |
| 7 | 6.35 | 19.05 | 30 | 1.8–8.9 | 377 | 1290 | 0–3.9 | 3.3–3.4 |

*The quantity max $T_a$ is the highest level reached by the air temperature during the trail. The quantity max $T_r$ is the highest surface temperature reached at the hottest spot of the refractory.

During the trials, observations were made on flame performance. Table 4 summarizes these observations on combustion stability and flame appearance.

TABLE 4

Flame performance in the adjustable burner tests: Observations on combustion stability and flame appearance in trials with the Example 4 burner. Burner parameters not varied: $D_1$ = 6.35 mm, $\beta_2$ = 10°.

| $\beta_1$, deg | $D_2$, mm | Auxiliary burner | Turndown limit[a], % of full fire | Remarks |
|---|---|---|---|---|
| 42.5 | 19.05 | On | 26, control limit | Good flame, no luminosity |
| | | Off | 40, flameout | Good flame, some luminosity |
| 35 | 24.31 | On | 42, lowest set | Good flame, slight to small luminosity, $NO_x$ elevated by 50–65% over case at $D_2$ = 19.05 mm |
| | | Off | 71, flameout | Good flame, $NO_x$ elevated as with pilot on |
| 35 | 19.05 | On | 42, lowest set | Good flame, occasional slight to small luminosity |
| | | Off | 71, flameout | Good flame, no luminosity |
| 35 | 15.85 | On | 42, lowest set | Good flame, slight luminosity at higher $O_2$ levels |
| | | Off | — | Not tested |
| 30 | 19.05 | On | 24, control limit | Good flame, no luminosity |
| | | Off | 20, control limit | Good flame, no luminosity. Turndown behaviour is that observed in Trial 950215, when more results were obtained for the same operating conditions, flameout was experienced at 71% of full fire, however, the burner was at this point exhibiting symptoms of deterioration from scaling (burning out), so this experience, at variance with 950210, is suspect. |

[a]Nominal full (100%) firing rate set at 350 kW, the maximum attained in single-burner operation of the Example 4 burner.

The results indicate that diminishing the fuel angle $\beta_1$ and maintaining the air port diameter $D_2$ reasonably small (thereby resulting in high air jet momentum flux) improves flame stability without a significant adverse effect on NOx emissions. According to the theoretical model of the entrainment aerodynamics of this burner, discussed below, both measures tend to advance the entrainment of the fuel jets by the air jets and shorten the flame.

Table 4 also raises the question of continuous operation of the auxiliary burner. With the pilot off, the best results are with $\beta_1=30°$, the smallest fuel port angle tested.

It is predicted that smaller values of $\beta_1$ will improve combustion stability subject to a minimum limit on $\beta_1$ beyond which NOx emissions begin to rise and reach unacceptable levels.

RESULTS

Figure 13:
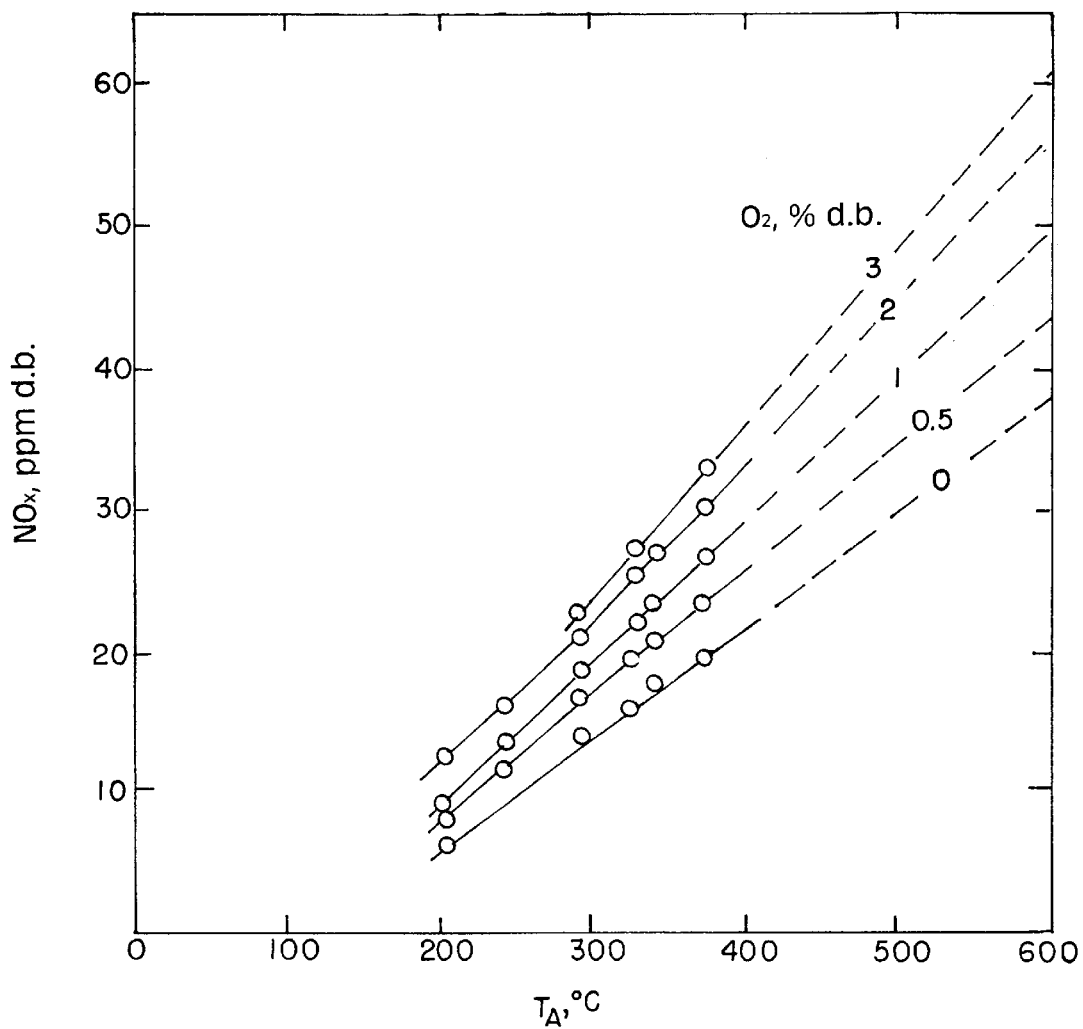
FIG. 13 is a graph of exhaust-gas NOx level versus combustion air temperature with varying exhaust-gas $O_2$ level for testing result of the Example 4 burner.

FIG. 13 is a graph of the exhaust-gas NOx level as a function of the combustion air temperature as the exhaust gas $O_2$ level is varied with the firing rate in the range from 289 kW to 368 kW. Burner parameters were $\beta_1=30°$, $\beta_2=10°$, $D_1=6.35$ mm and $D_2=19.05$ mm. The pilot burner was on. Based on FIG. 13, the relationship between NOx level as a function of air temperature, with the $O_2$ level as the parameter can be expressed by the following equation:

$$[NOx] = CT_a^{1.44}, \text{ where } C \text{ is a function of the } O_2 \text{ level} \quad \text{(Eq. 1)}$$
for $200°$ C. $< T_a < 600°$ C., except when:
$T_a < 300°$ C. at $[O_2] = 0\%$,
$T_a < 275°$ C. at $[O_2] = 0.5\%$, and
$T_a < 250°$ C. at $[O_2] = 1\%$ It was observed that at low $O_2$ levels NOx production drops off sharply as combustion reaches fuel rich conditions which is consistent with known behaviour of conventional burners, but which is also known to be impractical for reasons of pollution.

Figure 14:
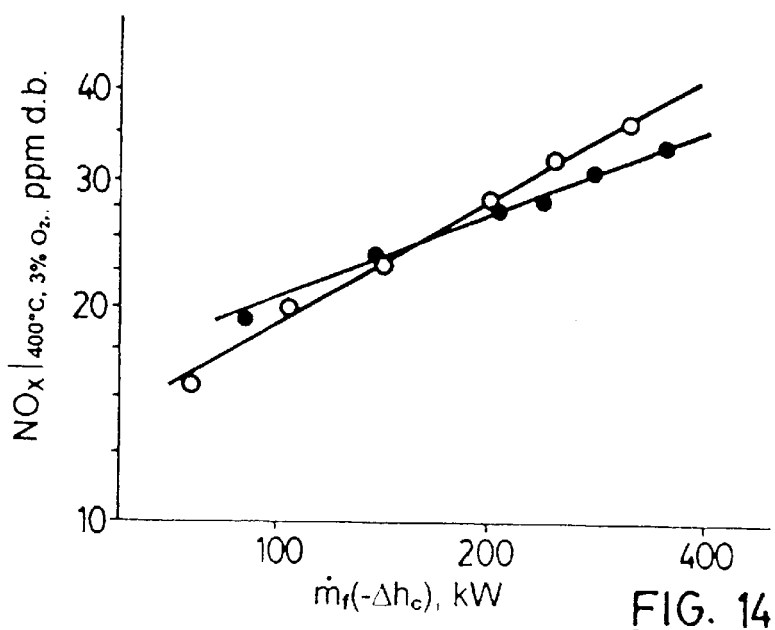
FIG. 14 is a graph of air-temperature-adjusted exhaust-gas NOx level at 3% $O_2$ dry base versus firing rate for data collected from testing conducted on the burner of Example 4.

Assuming equation 1 is valid for firing rates throughout the turndown range, correction can be made for the temperature effect. FIG. 14 is obtained by correcting data for other air preheat temperatures to NOx emissions for 400° C. to determine the effect of turndown in the firing rate alone with constant exhaust gas $O_2$ level of 3%. FIG. 14 illustrates that turndown in the firing rate over a 4:1 range significantly decreases NOx emission.

A power law is postulated for the relationship illustrated in FIG. 14 as follows:

$$[NOx]_{400° C., 3\% O_2} = C [m_f(-\Delta h_c)]^n \quad \text{(Eq. 2)}$$
where:
$n = 0.58$ for $\beta_1 = 30°$,
$n = 0.38$ for $\beta_1 = 42.5°$
$D_2$ constant at 19.05 mm FIG. 15 was obtained by correcting NOx emissions for $T_a=400°$ C. for trials in which $\beta_1=35°$ and $\beta_1=30°$. Equation 2 seems to hold for these plots except for a deviation at the lowest firing rate. The exponent n=0.81 for $D_2=15.88$ mm and 19.05 mm, but n decreases to 0.58 at $D_2=24.3$ mm.

Figure 15:
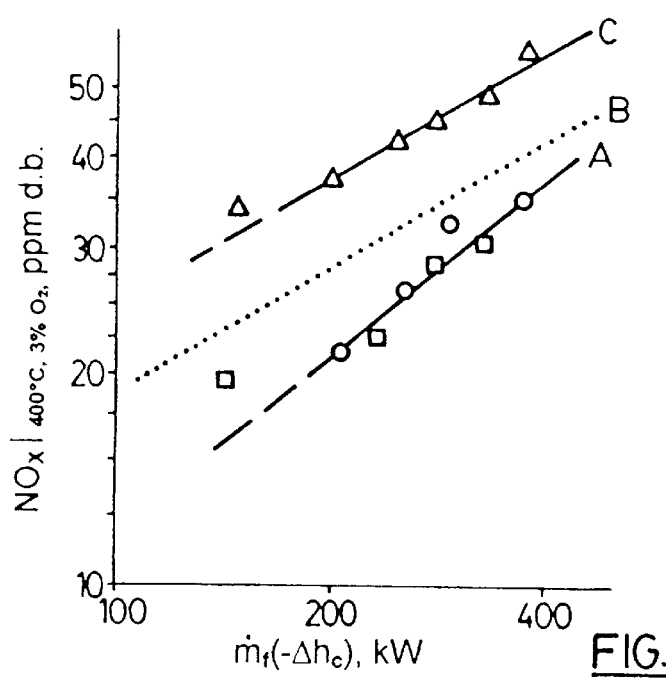
FIG. 15 illustrates the air-temperature-adjusted exhaust-gas NOx level at 3% $O_2$ versus the firing rate for data collected from testing conducted on the burner of Example 4.

The curve A in FIG. 15 represents data which has been temperature-correlated to 400° C., for $\beta_1=35°$ and $D_2=15.88$ mm and 19.05 mm. Curve C represents the same data for $\beta_1$ constant at 35° but $D_2=24.3$ mm. Comparison of curve A to curve C in FIG. 15 shows that NOx levels are significantly elevated when the air port diameter $D_2$ is increased. It is believed that the diameter of 24.3 mm lowered the air jet momentum flux to the point where the postulated entrainment of the fuel gases was no longer occurring or was significantly reduced, thus adversely affecting NOx. (Theoretical modelling, discussed later, predicts that the air jet momentum flux is an important factor in the entrainment phenomena which results in the low NOx emissions from burners with the configuration of the present invention.)

The dotted curve, curve B, in FIG. 15 represents the temperature-correlated data for $\beta_1=30°$ and $D_2=19.05$ mm. Comparison of curve A to curve B in FIG. 15, reveals that NOx emission at $\beta_1=30°$ is significantly elevated and that decreasing $\beta_1$ from 35° to 30° adversely affects NOx. The adverse affect on NOx must be weighed against the benefits of lowering $\beta_1$ to increase combustion stability and to obtain smaller flame size.

The data for a firing rate of about 300 kW with $\beta_1=30°$, $D_1=6.35$ mm, $\beta_2=10°$ and $D_2=19.05$ mm can be represented by the equation:

$$[NOx]_{400°} = 20 + 8.5 [O_2]^{0.577}, \text{ppm} \quad \text{(Eq. 3)}$$

where the $O_2$ level is in % and ranges from 1.5–24% d.b., and both NOx and $O_2$ are on dry basis.

Equations 1, 2 and 3 can be combined to postulate a general representation of NOx levels as a function of $O_2$ level, firing rate and air temperature as follows:

$$[NOx] = (20 + 8.5 [O_2]^{0.577}) (T_a/400)^{1.44} (m_f(-\Delta h_c)/300)^{0.58} \quad \text{(Eq. 4)}$$
for
$\beta_1 = 30°$
$D_1 = 6.35$ mm and $D_2 = 19.05$ mm
$\beta_2 = 10°$.

This correlation is roughly accurate for all trials, excluding the trial with the large air port diameter of $D_2=24.3$ mm. It is estimated that the range of practical reliability is somewhere in the ranges of:

$0 < [O_2] < 7\%$ d.b.,
$200°$ C. $< T_a < 600°$ C., and
50 kW $< m_f(-\Delta h_c) < 500$ kW.

However, this correlation is intended to give only a guide to and an appreciation of the effects of the operating variables. It is limited to the structure, system and operating conditions used in compiling the data on which it is based, and does not approach a fundamental explanation of the burner.

Figure 16:
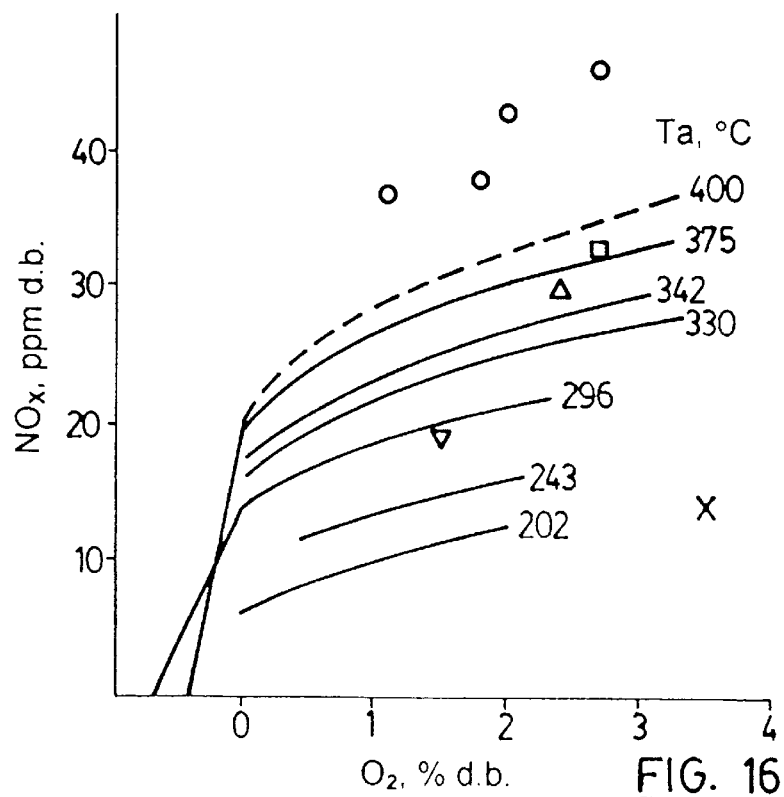
FIG. 16 graphs the exhaust-gas NOx level against the $O_2$ level with combustion air temperature as the parameter for data collected from testing conducted on both the burner of Example 3 and the burner of Example 4.

FIG. 16 illustrates the exhaust gas NOx level as related to the $O_2$ level with variable combustion air temperature. The smooth curves are from data obtained from testing with the Example 4 burner. The data indicated by discrete points in FIG. 16 was obtained from testing of the Example 3 burner. Agreement between the Example 3 results and the Example 4 results is close at the lower air temperatures, but the NOx levels reached with $\beta_1=65°$ at the highest temperature are somewhat elevated indicating that, at high temperatures at least, $\beta_1=65°$ is less desirable.

Preliminary studies were undertaken to investigate the location of the flame from the Example 4 burner. The burner specifications were $D_1=6.35$ mm, $D_2=19.05$ mm, $\beta_1=35°$ and $\beta_2=10°$. The burner was operated at full fire into the full furnace. Operating conditions for the three individual cases were as follows:

TABLE 5

Operating conditions of the nearfield trials with the Example 4 burner. Control settings (firing rate, excess air) were not varied within a set of trials, so only small variations in operating conditions occurred (those associated with incomplete approach to steady state, with changes in atmospheric pressure and temperature, and with the limitations of the control system itself). Burner parameters: $D_1 = 6.35$ mm (¼"), $D_2 = 19.05$ mm (¾"), $\beta_1 = 35°$, $\beta_2 = 10°$. Auxiliary burner: on. Combustion chamber: the full furnace.

| Case: | A | B | C | Remarks |
|---|---|---|---|---|
| $S_{b2}$ m$^2$ | 0 | 1 | 0 | — |
| $S_c$ m$^2$ | 13.5 | 12 | 13.5 | — |
| $S_n$ m$^2$ | 3 | 0 | 0 | Nearfield door & port |
| Exhaust O$_2$, % d.b. | 3.7 | 2.6 | 2.7 | — |
| m$_f$ kg/s | 0.00655 | 0.00653 | 0.00646 | — |
| m$_a$ kg/s | 0.1287 | 0.1212 | 0.1205 | — |
| m$_f$(-$\Delta h_c$), kW | 313 | 312 | 309 | — |
| $Q_{s,b}$, kW | 0 | 75.5 | 0 | — |
| $Q_{s,c}$, kW | 50.1 | 59.0 | 88.2 | — |
| $T_a$, °C. | 299 | 332 | 380 | — |
| max $T_t$, °C. | 880 | 1019 | 1139 | — |

Figure 17:
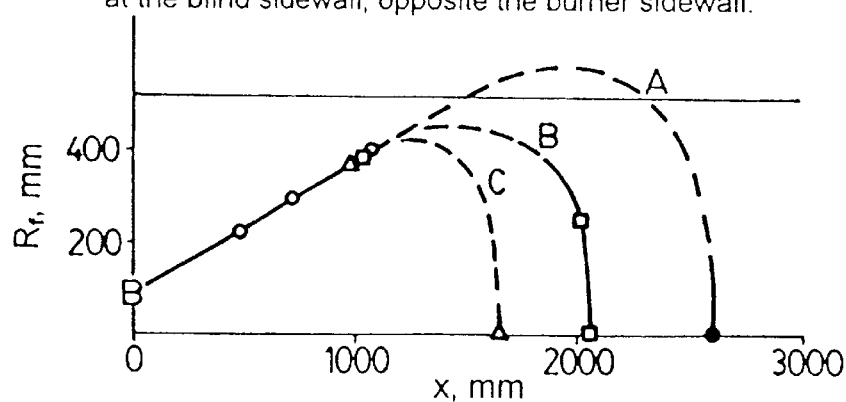
FIG. 17 illustrates flame radius as a function from distance from the burner exit plane as measured in testing on the flame of the burner of Example 4.

The flame boundary was assumed to be determined by where the time-mean CH$_4$ content effectively drops to zero, as in a turbulent natural gas-diffusion flame, the bulk of combustion heat release and most of the CO oxidation occurs within the zone where CH$_4$ is detectable FIG. 17 shows the lateral (horizontal or vertical) maximum $R_f$ (in mm) of the CH$_4$ content as a function of the distance $x_x$ (in mm) from the burner exit plane. The Case A flame actually impinges upon the sidewall of the furnace, so the length it might otherwise have in a furnace of adequate size to avoid this condition is not directly evident. The Case A illustrated in FIG. 17 is an estimate of what the Case A profile would be in a furnace large enough to avoid the impingement problem.

MULTIPLE-BURNER TRIALS

Tests were also conducted with three of the Example 3 burners fired side-by-side. The results showed that three burners of the present invention can be fired side-by-side with no adverse effect on flame stability. Therefore, confirming that the present burner is suitable for multi-burner firing. The NOx emissions under air preheat conditions remained well below the most stringent regulated limits, never exceeding 10 ppm @3% O2 in the flue. However, the NOx emissions were found to be double that of a single burner. It is believed that the presence of adjacent burners interferes with the entrainment process resulting in less entrainment of furnace gases and consequently NOx formation not being reduced to the same extent as in the single burner trials. It is believed that if the burners are spaced from one another appropriately, it will be possible to minimize this effect, subject of course to physical limitations within the furnace.

However, in a long furnace with a row of burners and product gas flow transverse to the burners, a substantial gradient may occur in the temperature for the recirculating products being entrained by the flame jets. In this case, NO$_x$ emission may increase (due to the higher temperature of the products being entrained) even if appropriate spacing is used. This holds true for other burners as well and is a reflection of the interaction between burner and furnace.

SINGLE JET MODELLING

The present invention contemplates multiple jets in both air and fuel. However, a simplified two-jet mixing pattern has been examined to provide a model and rough guide to the more complex behaviour of the multiple jet scenario. The model examines the mixing behaviour of an angled strong-jet, weak-jet (SJWJ) interaction.

Figure 18:
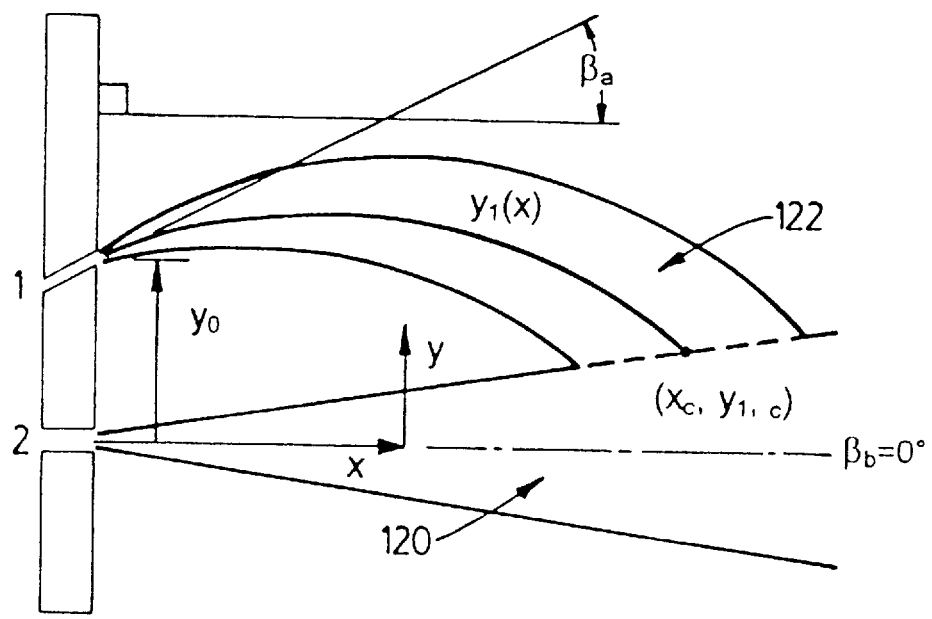
FIG. 18 illustrates the theoretical model for the angled strong-jet, weak-jet model (SJWJ) used for theoretical modelling of the combustion air dynamics of the burner of the present invention.

As illustrated in FIG. 18, the model is chosen with number of fuel and air jets N=1. A strong air jet 120 issuing normal to the exit plane ($\beta_a$=0). At a distance $y_0$ away, a weak fuel jet 122 issues from the exit plane at an angle $\beta_b$ to the normal. (Strong and weak are in the sense of momentum flux.) Typically, the burner exit velocities, $U_1$ and $U_2$ are similar, but the fuel jet is weaker since typically combustion of natural gas occurs on the air-rich side of stoichiometric. Thus, the fuel/air momentum ratio $\Psi$ is typically small. Entrainment is taken to occur effectively at the distance $x=x_c$ where the fuel jet trajectory meets the edge of the air jet.

It is assumed that the strong air jet is negligibly disturbed by the weak fuel jet and thus develops like an isolated free jet in a stagnant ambient gas, as if the fuel jet was not present. The air jet entrains ambient gas and so grows in mass flux as it moves in the x direction. The fuel jet on the other hand moves through a field of ambient gases flowing radially towards the air jet as a result of being entrained by the air jet. The fuel jet also entrains ambient gases, but those ambient gases have a component of velocity towards the air jet. Thus the fuel jet develops an increasing component of momentum towards the air jet and describes a curving trajectory closing in upon the air jet. At some point $x_c$, known as the point of confluence, the fuel jet meets the air jet and is entrained by it.

Figure 19:
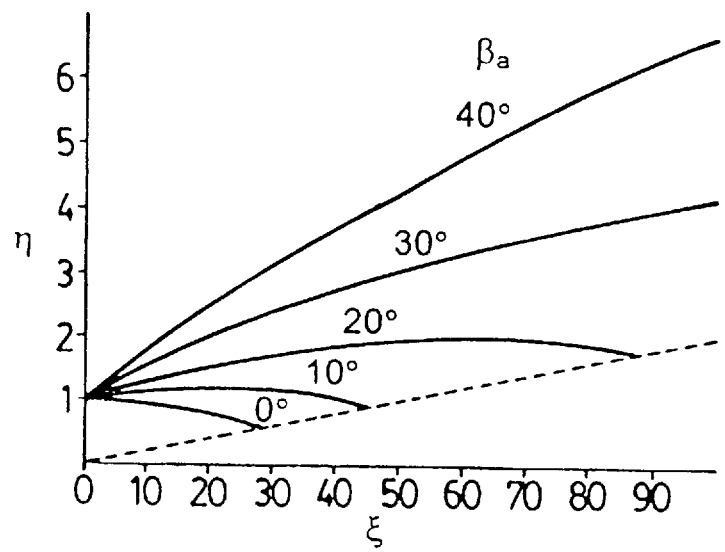
FIG. 19 illustrates fuel trajectories at varying fuel port angles with constant fuel/air momentum flux ratio of 0.02 for the theoretical model illustrated in FIG. 18.
Figure 20:
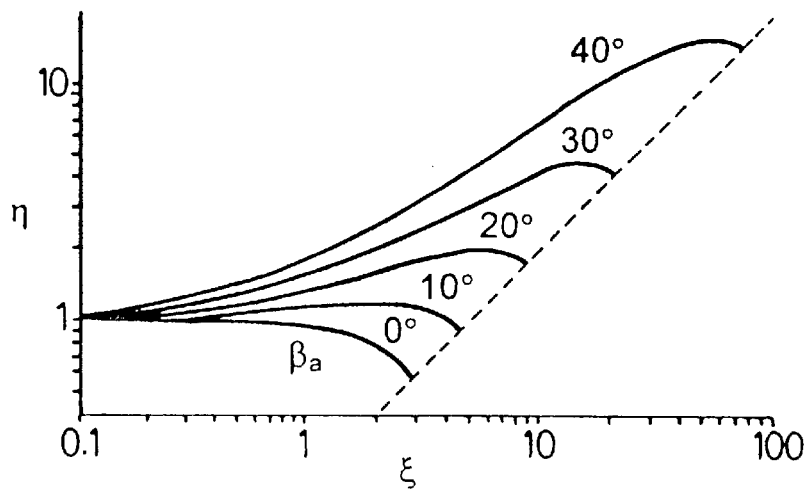
FIG. 20 illustrates the fuel jet trajectories at varying fuel port angles with a constant fuel/air momentum flux ratio of 0.02 on a log-log graph for the theoretical model illustrated in FIG. 18.
Figure 21:
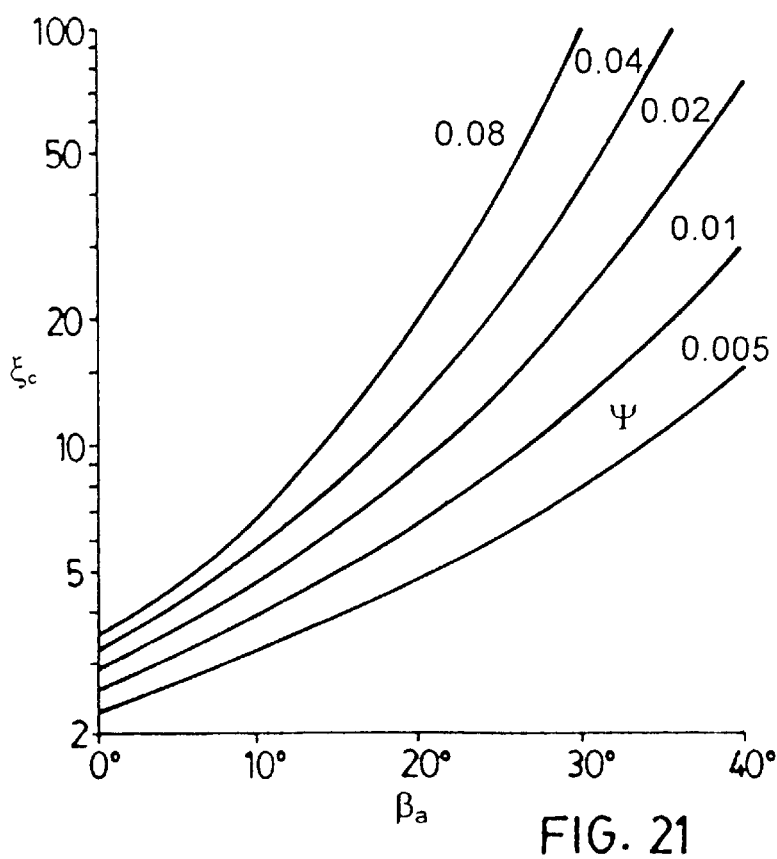
FIG. 21 illustrates the relationship between the streamwise point of confluence and the fuel port angle with the fuel/air momentum flux ratio as a parameter for the theoretical model of FIG. 18.

FIGS. 19 and 20 illustrate the behaviour of the fuel jet trajectory over a range of angles $\beta_a$=0°–40° at a fuel/air momentum flux $\Psi$=0.02 (a typical momentum flux ratio expected with these types of burners). The normalised streamwise and cross-stream co-ordinates are $\eta$=y/y$_0$ and $\xi$=x/y$_0$. FIG. 20 is a log-log graph which shows the point of confluence for all cases. (The shape is of course distorted). The effect of fuel port angle $\beta_a$ on the point of confluence $x_c$ is very strong, increasing by an order of magnitude as $\beta_a$ approaches 40°. FIG. 21 illustrates the relationship between the streamwise point of confluence $\xi_c$=x$_c$/y$_0$ and the fuel port angle $\beta_a$ with the fuel/air momentum flux ratio $\Psi$ as a parameter.

Over the ranges $\beta_a$632 15°–40° and $\Psi$=0.005–0.08, the curves of FIGS. 19 and 20 are well-fitted by the equation:

$$x_c = 6.5 y_0 \Psi^{0.1} \exp(0.01\ 25\ \beta_a^2 \Psi^{1/2}) \qquad (Eq.5)$$

The analysis shows that, for $\beta_a$=0°–40° and for momentum flux ratios $\Psi$ of the order of 0.02, the mass flux of the ambient fluid entrained by either jet up to the point of confluence, is, to a close approximation, $$m_e = 0.3 m_o (x_c/D_o)(\rho_e/\rho_o)^{1/2} \qquad (Eq.6)$$

where m$_o$=source flux (feeding either the fuel jet or air jet)

D$_o$=source port diameter (round orifices)

$\rho_e$=density of fluid being entrained (furnace gases)

$\rho_o$=density of source fluid (air or fuel)

Since usually $x_c/D_o$>>1, substantial dilution by entrainment can be expected. Furthermore, since the fuel port will generally be smaller than the air port, $x_c/D_o$ will be larger for the fuel jet and thus more entrainment will occur.

It should be emphasized that this gives only a rough prediction of behaviour of the present invention and depends on a number of theoretical assumptions and simplifications. Influences of adjacent jets on one another in a multi-jet environment can be expected to have an affect on the behaviour of the jet mixing patterns. Other factors, the angle of the air jet in particular, can also be expected to influence the interaction of the jets.

The model and equations can be applied to one of the data trials of Example 4. In this trial, the conditions were as follows:

Momentum flux $\Psi=0.0179$

Density of fuel $\rho_f=0.737$ kg/m$^3$

Density of air $\rho_a=0.498$ kg/m$^3$

Density of exhaust gas $\rho_e=0.201$ kg/m$^3$ (estimated)

$\beta_1=35°$ $\beta_2=10°$ $r_1=r_2=86$ mm $D_1=6.35$ mm $D_2=19.05$ mm

To apply the modelling equations, $\beta_a$ is trigonometrically determined from $\beta_1$ and $\beta_2$ to be 26.3°. Similarly, $y_0$, equivalent to $d_{12}$, the absolute distance between a pair of adjacent air and fuel jets, is trigonometrically determined as 38.3 mm. Substituting in, ignoring the effects of multiple jet interactions, the model equations predict:

$x_c=529$ mm  (from Eq.5)

$m_e/m_f=13.9$ for the fuel jets  (from Eq.6)

$m_e/m_a=5.65$ for the air jets  (from Eq.6)

Thus, the entrainment ratios indicate that before the fuel and air jets meet, and the flame properly begins, the fuel is on average, diluted with combustion products at a rate of 13.9 kg/kg and the air is diluted with 5.65 kg/kg. This is a strong effect which achieves "fuel gas recirculation" via combustion aerodynamics within the internal chamber of the furnace. No external ducting is required.

It should be noted that when excess air is used, the products gases will contain some oxygen. Thus the fuel jets which entrain this oxygen will begin some preliminary combustion before the point of confluence. In the example above, suppose the excess air level is 15%. In that case, the 13.9 kg of product gases entrained per kg of the fuel jet, contains 0.400 kg of oxygen compared to the 3.81 kg required for complete combustion. Thus this is a fuel-rich/oxygen-deficient condition. However, by increasing the fuel-jet momentum flux and/or by increasing the excess air level, a much higher proportion of the oxygen required for combustion could be supplied through the entrainment of product gases.

CONCLUSIONS

Emissions Performance

The burner described in the present invention results in ultra low emissions of NOx when operated with preheated oxidant. The burner implements two NOx control mechanisms: high degree of internal flue gas recirculation coupled with a fuel rich reducing zone which converts in part the NOx produced to molecular nitrogen. The reduction in NOx is realized without a penalty in terms of high CO or unburned hydrocarbons.

Burner Variables

The effects of the air and exhaust-gas temperatures on NOx are monotonic; the emission rises with increasing temperature.

The effects of the burner variables that were studied, namely the fuel-port angle $\beta_1$ and the air port diameter $D_2$, should be expected to, and evidently do, show minima. The minima appeared to be fairly flat, giving a fairly broad practical optimum operating region. The NOx levels found for $\beta_1=35°$ and 42.5° are practically the same. It appears that decreasing $\beta_1$ to 30° raises the emission slightly, as does an increase to 65°.

Changing the air port diameter $D_2$ at any given flow rate changes the air jet momentum flux. The NOx levels found for $D_2=15.88$ mm and 19.05 mm are practically the same, but there is a significant elevation at 24.31 mm. It must also be noted that the fuel port diameter $D_1$ and the air port angle $\beta_2$ were not varied, so the picture afforded by the investigations to date is incomplete.

It will be evident, however, from the modelling of the entrainment aerodynamics, that the effect on NOx emissions of the magnitude of the angles is interrelated with the mass and momentum flux ratios, and that negative effects of the former can be counteracted by adjustments of the latter (and vice versa).

Although the influence of the fuel jet angle $\beta_1$ on NOx emission is not great over the range studied, the effects on flame definition and combustion stability are of a different magnitude. The relation is monotonic: stability decreases with increasing $\beta_1$. At $\beta_1=65°$, as may be appreciated from the strong-jet/weak-jet model, the fuel jets are not entrained by the air jets before impinging on the furnace walls. Instead, the fuel jets impinge fully upon the combustion chamber boundaries in the tunnel-furnace operation and from there disperse widely, mixing with the furnace gases. A very dilute fuel—product mixture is then entrained by the air jets. Reaction generally is enfeebled by the dilution and drop in temperature and the effect of reaction zone which is greatly enlarged. Therefore, stability is adversely affected. The turn down limit is considerably raised compared to that at a lower $\beta_1$ and the furnace must be run at higher exhaust gas temperatures to maintain a stable operation. Therefore, larger values of $\beta_1$ are less desirable. Stability improves steadily with decreasing $\beta_1$, as might be expected from the SJWJ model. The fuel jet ceases to impinge on the furnace walls, arching sufficiently to meet the air jets, and the height and length of the arch decrease. The amount of product gas entrained by both fuel and air jets before they meet decreases. All this improves stability, but at some point fuel and air meet too directly and the NOx production begins to rise. Therefore, the optimum value for $\beta_1$ would appear to be a compromise between a larger value to provide greater NOx reduction and a smaller value to maintain combustion stability.

Flame Size and Combustion Intensity

The flame size with present burner was found to be somewhat larger than conventional flames, with the intensity being around 60,000 Btu/ft$^3$hr as compared with typical flame intensities of around 150,000 Btu/ft$^3$hr for turbulent diffusion flames. Flame probing, however has demonstrated a stable flame core as opposed to very low intensity volumetric combustion. Moreover it is known that by adjusting angles of introduction of fuel and oxidant jets ($\beta_2$ and $\beta_1$) the flame intensity can be further raised and the flame size reduced.

Effect of Auxiliary Burner

Continuous operation of the auxiliary burner can improve stability, without apparent penalty in terms of NOx emissions, allowing greater turn down and operation at lower furnace temperature levels. The achievement of low NOx at high air preheat temperature through the principle described in this invention, involves heavy, aerodynamically-induced dilution of air and fuel with cooled products. This mixing results in poor combustion stability.

Negative effects of this mixing can be considerably ameliorated by continuous operation of the auxiliary burner. Since a pilot burner must be provided for start-up, additional costs through continuous use of the pilot burner as an auxiliary burner during operation of the burner should be minimal. However, at least for some configurations, temperatures, and/or operating conditions, it may not be necessary to operate the auxiliary burner continuously.

Combustion Stability and Operating Temperature Niche

Operation at temperatures at below an exhaust gas temperature of 900° C. and average of refractory temperature below 830° C. can result in flame instability. Therefore, it is considered that steady state levels with the exhaust temperature greater than 1000° C. or the refractory temperature greater than 900° C. are desirable.

Effect of O2 Content

The burner was operated at a range of excess air levels from fuel rich (negative excess air minus 1.4%) to around 30% excess air under varying furnace operating temperatures.

The flame was stable at excess air levels of 10% or more under all furnace operating temperatures. At exhaust temperature levels equal to or higher than 1300° C., stable flame was maintained down to stoichiometric conditions (0% excess air). Even higher exhaust gas temperatures allowed stable operation under fuel rich conditions. At lower exhaust gas temperature levels, a loss of flame was recorded as excess air levels were reduced. However, this is thought to be a flame detection issue, involving the location of the uv flame sensor, rather than an indication of reduction in stability.

A mild dependence of NOx emission on excess air was observed.

Exhaust gas NOx level was roughly proportional to $[1+0.4[O_2]]^{1/2}$, where $O_2$ is the exhaust gas oxygen content on a percent dry basis.

Effect of Fuel/Air Momentum Flux Ratio

As demonstrated by the strong jet model, the height and the length of the fuel jet trajectories to the point of confluence with the air jets depends on the fuel/air momentum flux ratio, as well as the fuel jet angle. Both height and length are decreased by increasing the fuel port diameter $d_1$, thus decreasing the fuel momentum at a given rate.

Capacity Rating and Turn Down

It appears that for a given burner operating at given levels of excess air and furnace gas temperature, there is a more or less definite lower stability limit, a firing rate below which combustion stability is uncertain and flameouts can be expected. On the other hand, firing rates high enough to produce a high flow instability have not been observed, and it appears from theoretical considerations that the flame should be stable at the highest gas and air port velocity that might be of practical interest.

The minimum practical firing rate is determined by the low—fire combustion stability of the burner flame in the furnace. The maximum firing rate is normally set by the fan or blower capacity, and an up delivery pressure must be available to counter the pressure drops across the burner, the recuperator (if any), the orifice or other flow—measuring device and the supply line. The maximum turn down (the ratio of the maximum firing rate to the minimum) is apparatus—dependant, the maximum firing rate being determined by the fan or blower capacity.

Scale Up Potential

Based on data to date, there is no perceived problem in scaling up the burner of the present invention to much larger capacities. The burner has been successfully scaled up from 65 kW to 400 kW and further scale-up to large industrial sizes is contemplated. Either direct scale-up maintaining geometric similarity, or a non-linear scale-up increasing the number of fuel and oxidant ports, or a combination of these, as was used to scale-up from 65 kW to 400 kW may be adopted for further scale-up.

Final Summary

It will be recognized that the combination of the number of jets, fuel and air, the angles of orientation of the air and fuel orifices, and the port diameter to be used for any given application depends upon the desired flame characteristics, the nominal input required and the required turn down ratio for a stable flame.

The fundamental feature of the present invention is the diverging turbulent jets of air and fuel. It will be understood that a number of different combination of angles can be used so long as the air jets and gas jets diverge. However, optimal NOx reduction may occur at a specific combination, or over a limited range, for a given input and specified flame characteristics. The relation between $\beta_1$ and $\beta_2$ must be such that the appropriate aerodynamic entrainment of the air jets and the fuel jets occurs. Aerodynamic theory of turbulent jet entrainment predicts that if the angles between two divergent jets reaches more than approximately 50°–60°, entrainment will not occur within a practically reasonable distance and at larger angles the jets will continue to diverge.

The relative sizes of the jets are also important. The sizes of the jets must be such that a stable flame is formed. The fuel and air jets must also have sufficient and appropriate relative momentum for entrainment to occur. Momentum of the jets depends on the exit port diameters, the number of jets and the input rate.

There are other design limits arising from physical constraints for a given firing rate and size of burner head. Given a set of required operating conditions, it can be predicted with reasonable accuracy and a minimum amount of routine experimentation what the optimal configuration should be.

As a result of the observations described above, it is believed that the number of air jets and fuel jets could range from 3 to 30, the upper limit subject to physical constraints such as space to provide the jets and input rate.

It is also believed that the angle of the air jets can vary from 0° to 30° and the angle of the fuel jets can range from 10° to 70°. It will be understood that the choice of the two angles is interrelated, subject to the discussion above.

While the above description constitutes the preferred embodiments, it will be appreciated that the present invention is susceptible to modification and change without parting from the fair meaning or proper scope of the accompanying claims.

We claim:

1. A burner, for combusting a gaseous fuel, the burner comprising:
   an oxidant supply duct;
   a fuel supply duct;
   an oxidant port means connected to the oxidant supply duct and comprising a plurality of oxidant ports for discharging a plurality of oxidant jets;

a fuel port means connected to the fuel supply duct and comprising a plurality of fuel ports for discharging a plurality of fuel jets and arranged around the oxidant ports;

wherein the oxidant port means and the fuel port means are arranged such that the oxidant and fuel jets diverge from one another, the divergence being such that each of the oxidant or fuel jets entrain a substantial quantity of surrounding furnace gases to effect recirculation of the furnace gases and thereafter the oxidant jets eventually entrain the fuel jets, causing the oxidant jets, the fuel jets and the entrained furnace gases to mix with one another to form a stable combustion zone, wherein the entrainment of furnace gases effects dilution of the oxidant and the fuel in the combustion zone, thereby lowering temperatures in the combustion zone and wherein the fuel jets undergo pyrolysis during the course of their trajectories creating a reducing zone.

2. A burner as claimed in claim 1, wherein the burner includes a longitudinal axis, wherein the plurality of oxidant ports are arranged generally symmetrically around the longitudinal axis of the burner, and wherein the plurality of fuel ports encircle the oxidant ports and are arranged generally symmetrically around the longitudinal axis of the burner.

3. A burner as claimed in claim 2, wherein the oxidant ports are provided in a first circle around the longitudinal axis and evenly spaced along the periphery of the circle, wherein the fuel ports are arranged in a second circle and evenly spaced along the periphery of the second circle, and wherein the oxidant ports are inclined at a first angle to the longitudinal axis and the fuel ports are inclined at a second angle to the longitudinal axis greater than the first angle.

4. A burner as claimed in claim 3, wherein the fuel and oxidant ports are provided in a common housing and wherein the oxidant and fuel supply ducts extend separately into the housing.

5. A burner as claimed in claim 4, wherein an equal number of oxidant ports and fuel ports are provided.

6. A burner as claimed in claim 5, wherein each of said fuel ports is spaced equally between two adjacent oxidant ports.

7. A burner as claimed in claim 6, wherein the number of oxidant ports ranges from 3 to 30.

8. A burner as claimed in claim 5, wherein the first angle of the oxidant ports ranges from 0 to 30 degrees.

9. A burner as claimed in claim 5, wherein the second angle of the fuel ports ranges from 10 to 70 degrees.

10. A burner as claimed in claim 5, wherein six oxidant ports are provided, said first angle of the oxidant ports is 10 degrees, and said second angle of the fuel ports is 65 degrees.

11. A burner as claimed in claim 5, wherein seven oxidant ports are provided, said first angle of the oxidant ports is 10 degrees, and said second angle of the fuel ports is 65 degrees.

12. A burner as claimed in claim 4, wherein the housing includes a burner block comprising a ceramic of a grade to withstand high temperature.

13. A burner as claimed in claim 1, wherein seven oxidant ports are provided, said first angle of the oxidant ports is 10 degrees, and said second angle of the fuel ports is 35 degrees.

14. A burner as claimed in claim 1 further comprising an auxiliary burner for ignition from a cold start and for constant operation during combustion, the auxiliary burner comprising a housing, a spark electrode, an inlet for gas, and an inlet for oxidant, so that when oxidant and fuel are introduced into said housing through said inlets, and said electrode is sparked, combustion of the introduced fuel and oxidant creates a pilot flame.

15. A burner as claimed claim 1, which is rotationally symmetrical about the longitudinal axis.

16. A burner as claimed claim 1, wherein all of the oxidant and fuel ports are axisymetrical.

17. A method of combusting a gaseous oxidant and a gaseous fuel, the method comprising: discharging the oxidant in a plurality of discrete jets arranged around a longitudinal axis; simultaneously discharging the fuel in a plurality of jets around the oxidant jets, adjacent fuel and oxidant jets being arranged to diverge away from one another such that each of the oxidant jets and the fuel jets entrain a substantial quantity of surrounding furnace gases to effect recirculation of the furnace gases, and such that, thereafter, the oxidant jets eventually entrain the fuel jets, thereby resulting in mixing of the oxidant jets, the fuel jets and the entrained furnace gases, to form a stable combustion zone, the entrained furnace gases effecting dilution of the oxidant and the fuel in the combustion zone to lower temperatures in the combustion zone and wherein the fuel jets undergo pyrolysis during the course of their trajectories creating a reducing zone.

18. A method is claimed in claim 17, which includes arranging the oxidant jets generally symmetrically in a circle, and arranging the fuel jets generally symmetrically in another circle, encircling the oxidant jets.

19. A method is claimed in claim 18, which includes providing approximately similar jet velocities for the oxidant jets and the fuel jets.

20. A method is claimed in claim 18, which includes providing a momentum flux ratio of the fuel jets to the oxidant jets in the range 0.005–0.08.

21. A method is claimed in claim 18, which further comprises providing an equal number of oxidant jets and fuel jets, which alternate with one another, arranging the jets around a longitudinal axis with the oxidant ports inclined from the longitudinal axis by an angle in the range 0°–30° and the fuel jets inclined from the longitudinal axis by an angle in the range 10°–70°, with the fuel and oxidant jet angles being selected to ensure stable operation.

* * * * *

UNITED STATES PATENT AND TRADEMARK OFFICE
CERTIFICATE OF CORRECTION

PATENT NO. : 5,772,421

DATED : 6/30/98

INVENTOR(S) : Besik et al.

It is certified that error appears in the above-identified patent and that said Letters Patent is hereby corrected as shown below:

Column 28, line 1, change "1" to --7--.

Signed and Sealed this

Sixteenth Day of February, 1999

Attest:

Attesting Officer

Acting Commissioner of Patents and Trademarks